(12) United States Patent
Lindsay

(10) Patent No.: US 7,577,918 B2
(45) Date of Patent: Aug. 18, 2009

(54) VISUAL EXPRESSION OF A STATE OF AN APPLICATION WINDOW

(75) Inventor: Donald J. Lindsay, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 361 days.

(21) Appl. No.: 11/181,901

(22) Filed: Jul. 15, 2005

(65) Prior Publication Data
US 2007/0016873 A1 Jan. 18, 2007

(51) Int. Cl.
*G06F 3/00* (2006.01)
*G06F 3/048* (2006.01)

(52) U.S. Cl. ....................... 715/781; 715/716
(58) Field of Classification Search .......... 715/716, 715/781
See application file for complete search history.

(56) References Cited

U.S. PATENT DOCUMENTS

| | | | | |
|---|---|---|---|---|
| 5,333,256 A | * | 7/1994 | Green et al. ............. | 715/772 |
| 6,098,084 A | * | 8/2000 | Mori ...................... | 715/236 |
| 6,108,003 A | * | 8/2000 | Hall et al. ............... | 715/772 |
| 7,019,757 B2 | * | 3/2006 | Brown et al. ............ | 345/592 |
| 7,146,573 B2 | * | 12/2006 | Brown et al. ............ | 715/802 |
| 7,386,807 B2 | * | 6/2008 | Cummins et al. ........ | 715/797 |
| 2003/0142140 A1 | * | 7/2003 | Brown et al. ............ | 345/803 |
| 2003/0142143 A1 | * | 7/2003 | Brown et al. ............ | 345/836 |
| 2005/0174365 A1 | * | 8/2005 | Malmstrom ............. | 345/698 |

* cited by examiner

*Primary Examiner*—William L Bashore
*Assistant Examiner*—David Phantana-angkool
(74) *Attorney, Agent, or Firm*—Shook, Hardy & Bacon LLP

(57) ABSTRACT

A method for changing a visual state of an application window representation is described. The method includes steps of displaying an application window representation with a default visual state, and changing the default visual state of the application window representation to one of at least two different visual states. The entirety of the application window representation or a portion of the application window representation may have a change to its visual state. The visual states may be a change in color, pattern, and/or texture. A group of visual states changes may correlate to an animation. Visual states may be defined by a default or user configurable. Visual states may change over time or in response to an event. Visual states may change back to a default state when the application window representation is accessed.

19 Claims, 17 Drawing Sheets

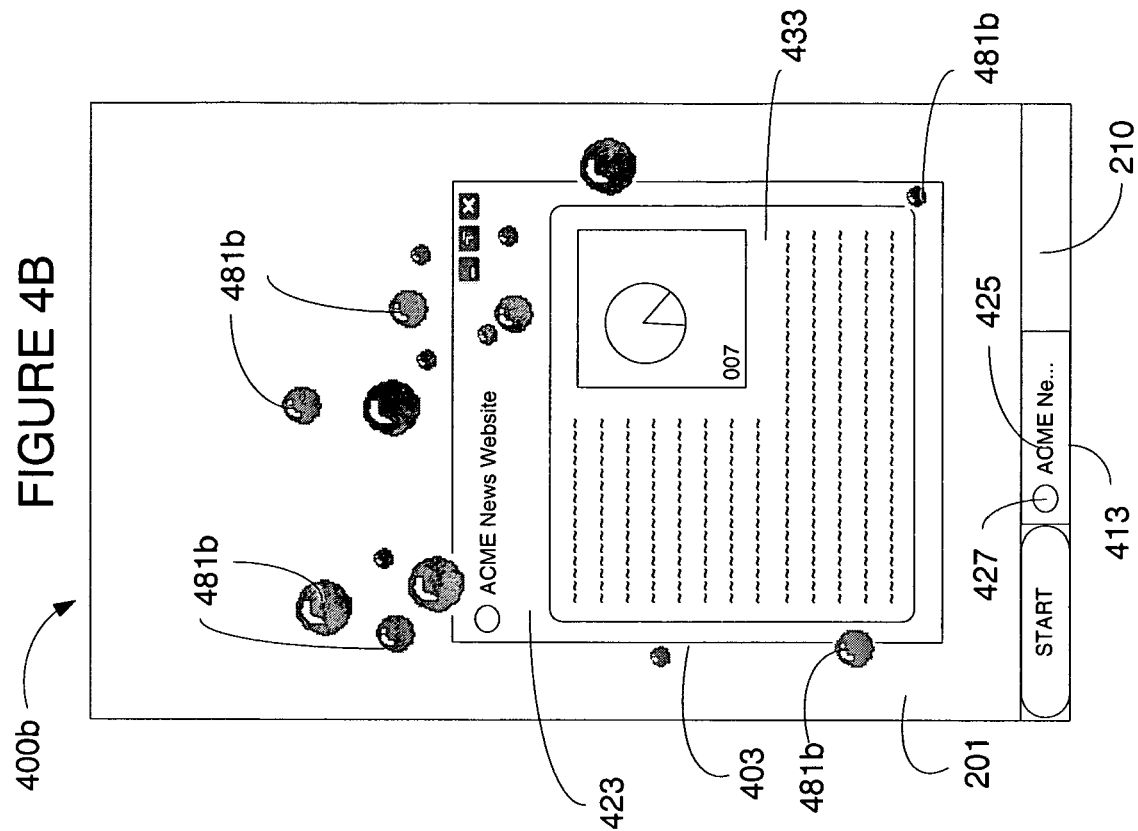
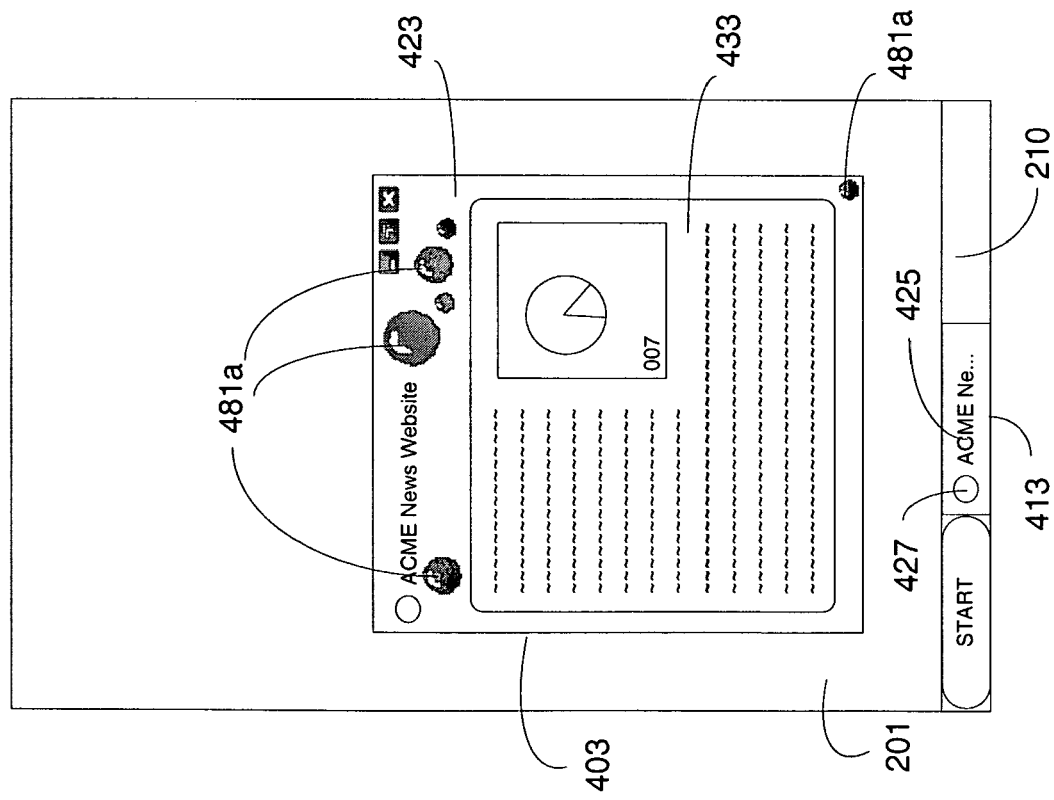

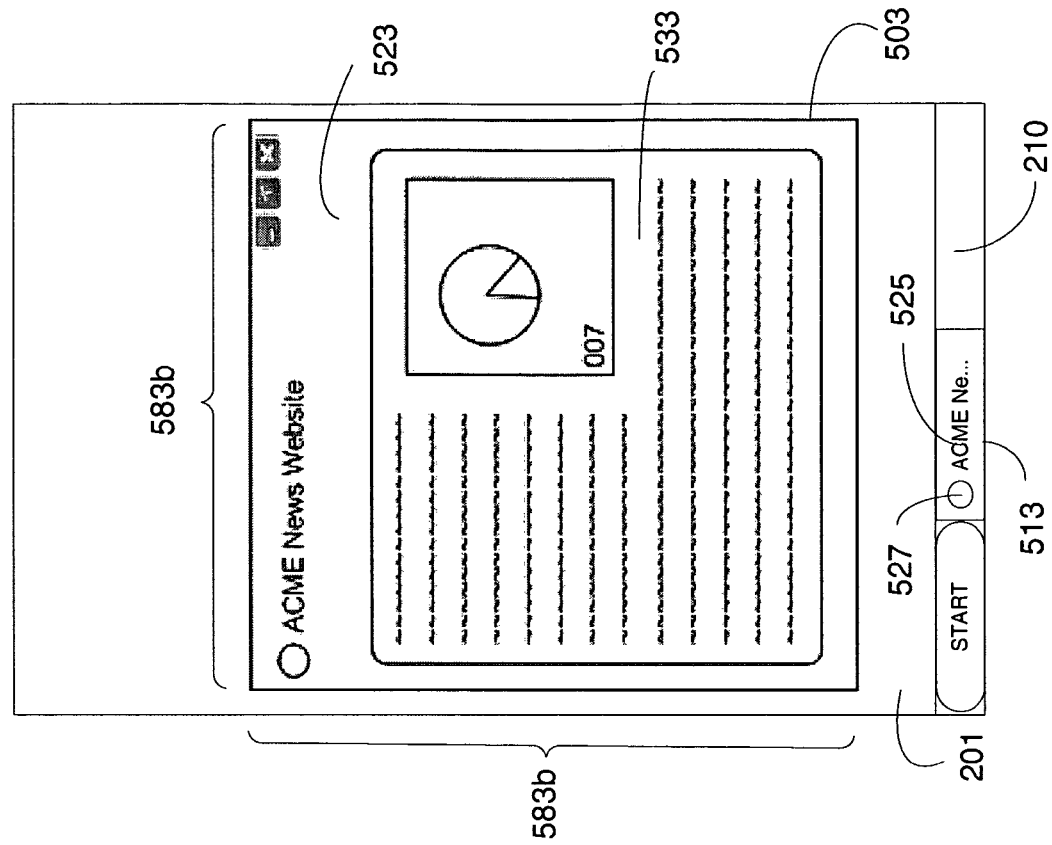
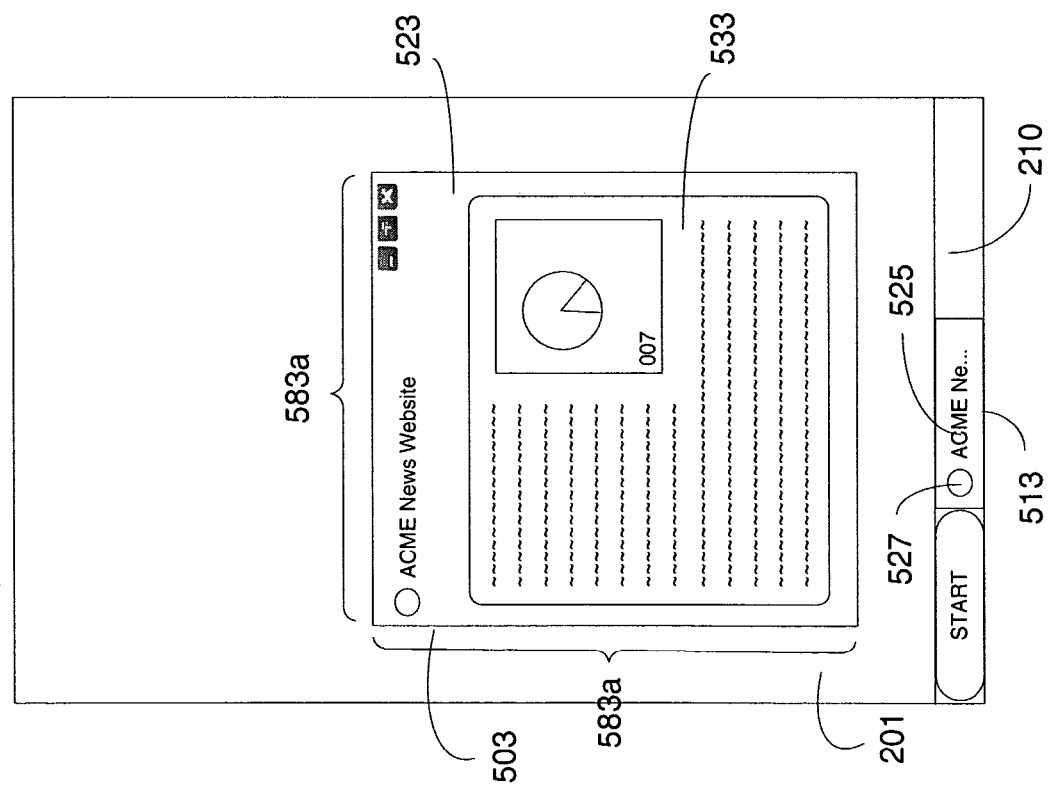
FIGURE 5A
FIGURE 5B

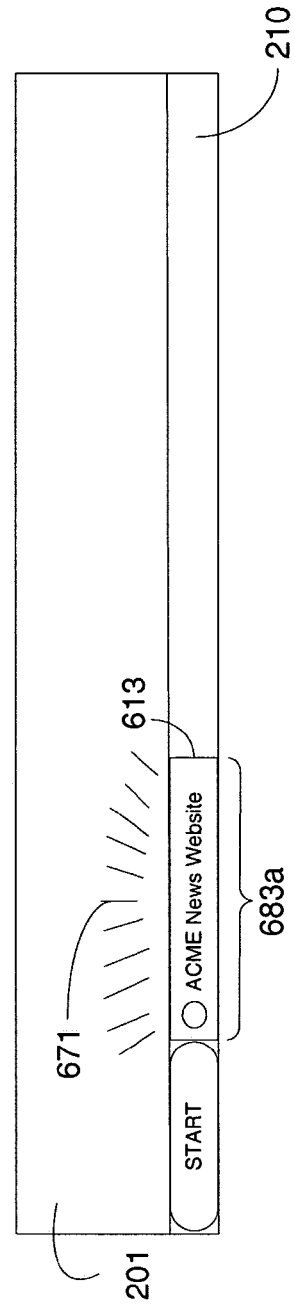
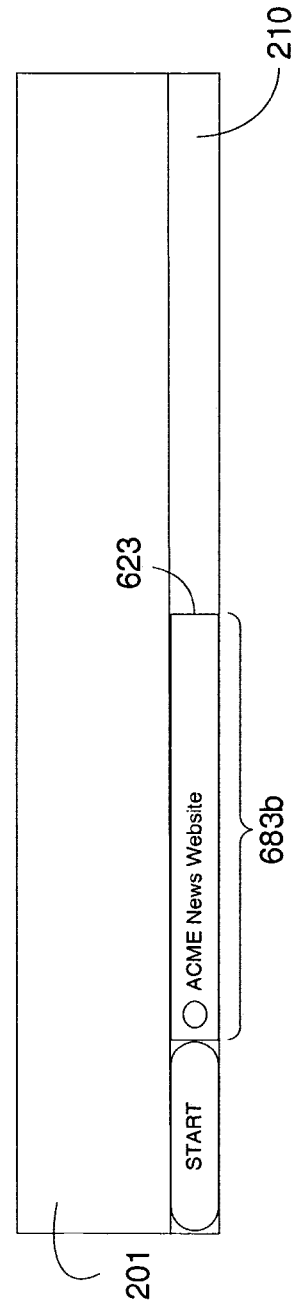
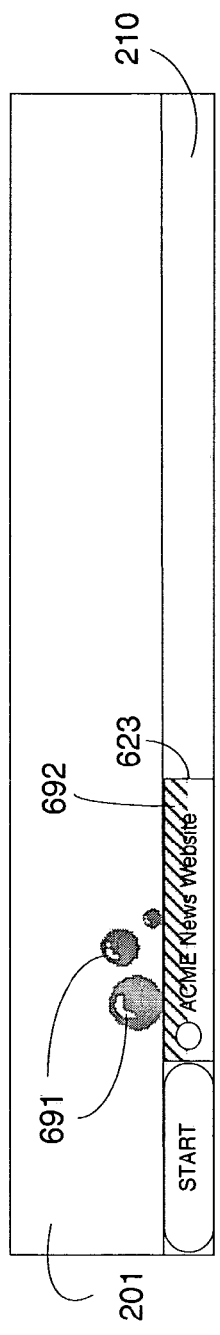
FIGURE 6A (PRIOR ART)
FIGURE 6B
FIGURE 6C

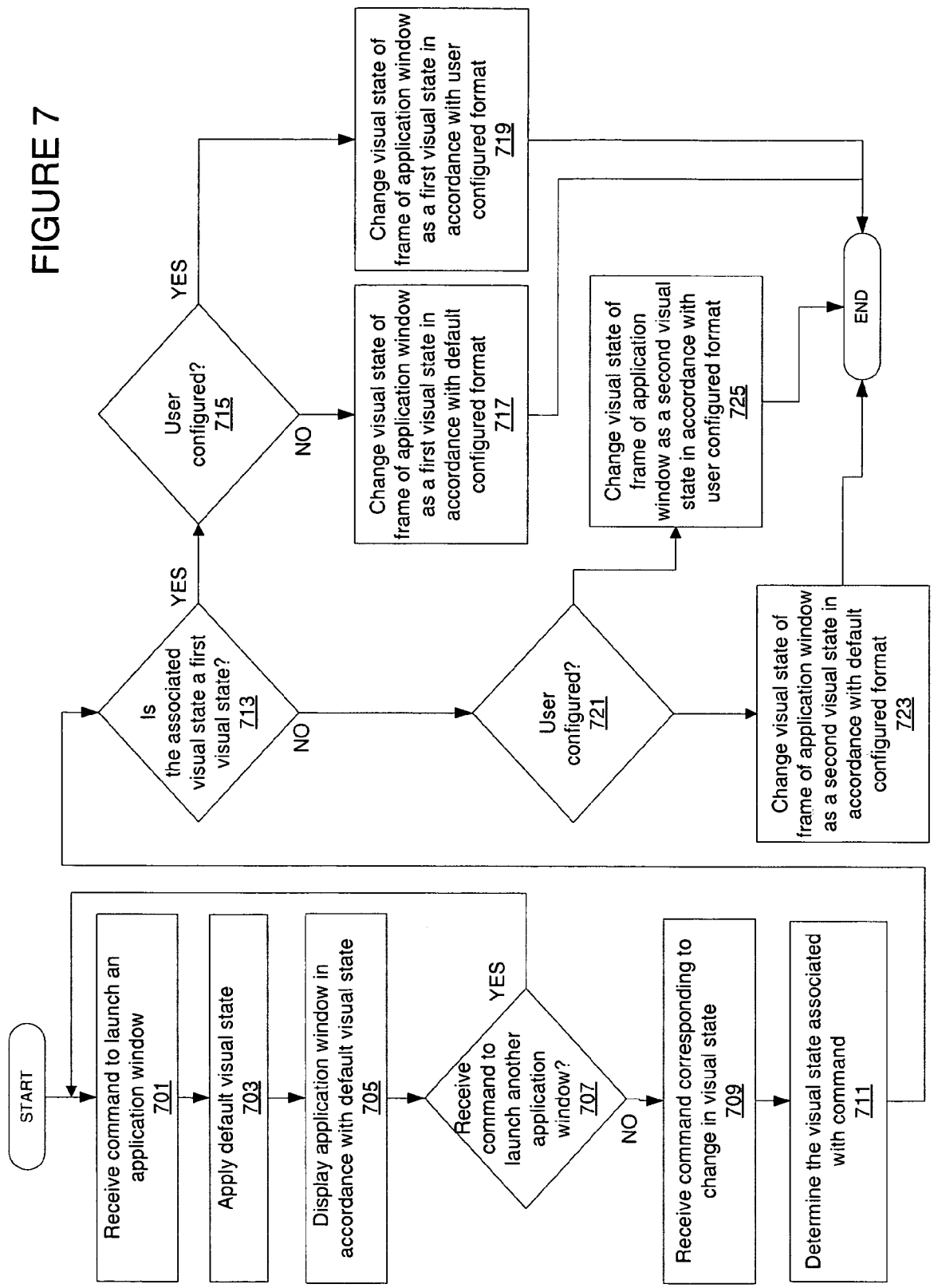

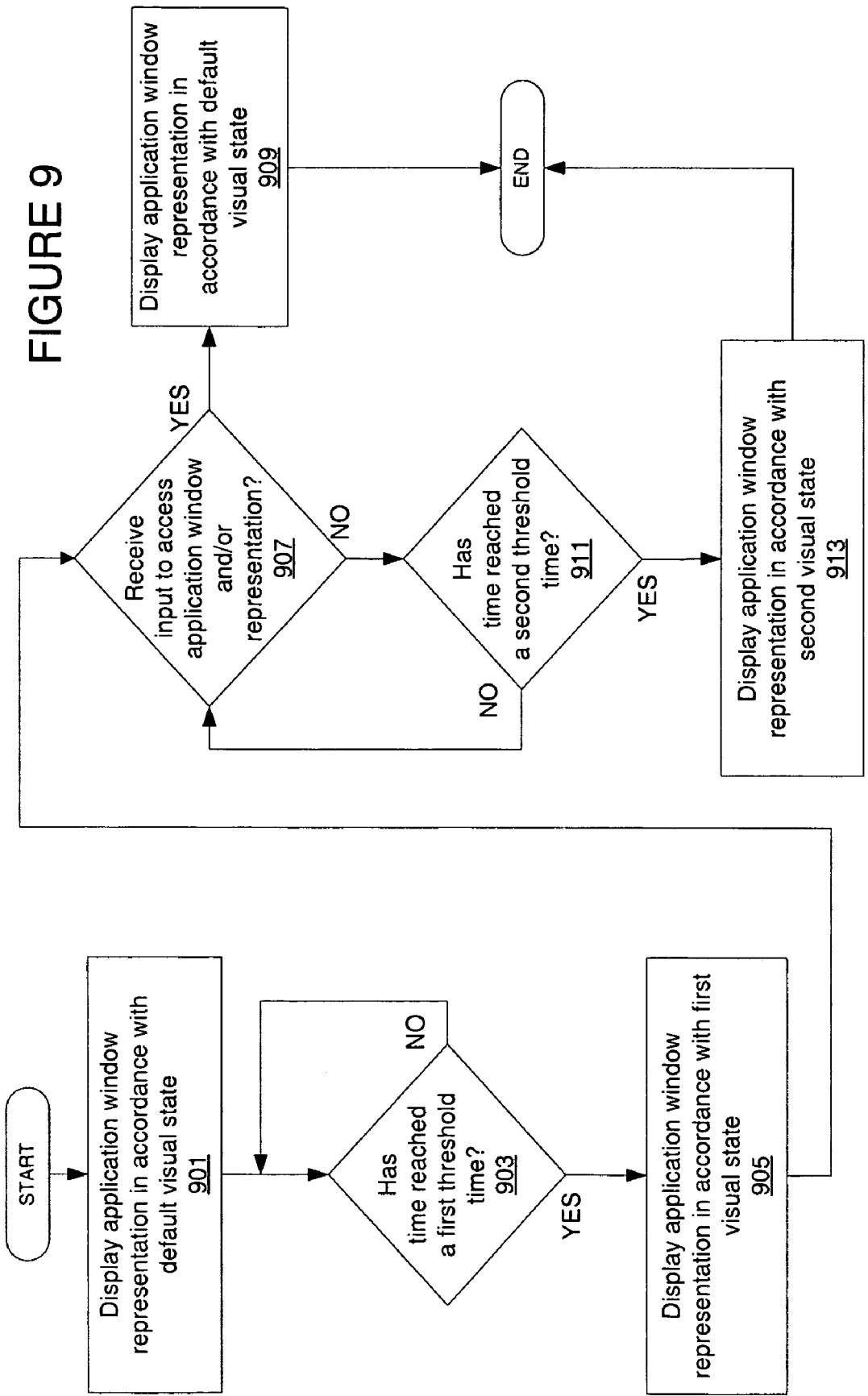

VISUAL EXPRESSION OF A STATE OF AN APPLICATION WINDOW

BACKGROUND

As the use of computers in both the workforce and personal life has increased, so has the desire to allow for easier use of them. Many operating systems today utilize a windows based configuration of application programs. Information is displayed on a display screen in what appears to be several sheets of paper. By interfacing with the windows, a user can access any window as if grabbing a single sheet of paper. A windows based configuration allows a user to have two or more windows open on a display screen simultaneously.

Application windows are a user interface facility of all graphical user interface (GUI) systems. While application windows may vary in appearance across systems, they share many common attributes, such as a frame area with a title bar control containing window management controls, the ability to be resized and repositioned and to exist among other application windows associated with different applications. Together, multiple application windows can appear simultaneously on the screen, layered on top of each other, typically represented by the order each application window was last accessed by the user. When an application window is the window that a user is working with currently, its frame appears in an active visual state. This is in contrast to an inactive visual state when the application window is not the window the user is currently working with. These two states typically have different appearances and primarily serve to communicate to the user which application window she is currently working with.

A user interaction scenario common to modem GUIs involves multiple simultaneous application windows that share a common screen real estate. Support for multiple simultaneous application windows is part of the appeal and power of a modem GUI, but this frequently results in application windows overlapping and obscuring each other making it difficult for the user to locate or navigate to a specific application window. This type of scenario and associated solutions are commonly referred to as window management problems and solutions.

A common user interaction scenario involves an application window that requires the attention of a user to address an issue with the application process. The application window is not the application that the user is currently working with, or the application window is not currently front-most among multiple, layered application windows. Resolving this scenario requires the user to access the problematic application window, typically by selecting through a computer input device on the application window, subsequently re-layering the selected application window on top of all other application windows. Often, simply activating the application window resolves the requirement for the application to get the attention of the user.

In Windows XP by Microsoft® Corporation of Redmond, Wash., the method for indicating that an application window requires the attention of the user is to flash the frame of the application window between the active and inactive visual states. Furthermore, in Windows XP, the Task Bar application window tile control that is indirectly associated with the application window simultaneously flashes between two visual states, normal and a dedicated alert state. This implementation limits the ability of an application to express the degree or urgency to which the user's attention is required/requested. In Mac OS X by Apple Computer, Inc. of Cupertino, Calif., there is no parallel mechanism that employs the application window. Alerting the user is indirectly achieved through an animation of the associated application icon on the application launch/switch facility, "the Dock". There is no mechanism to represent a scale of urgency. Today only a single application state can be expressed, effectively making all expressions of the same intrinsic value to the user.

SUMMARY

Aspects of the present invention are directed generally to window arrangements in an operating system. More particularly, aspects of the present invention are directed to a method and system for changing visual states of an application window representation in an operating system.

There exists a need for the ability to support a range of application window visual states, thereby providing the ability for an application to more effectively communicate the urgency to which a user's attention is required/requested. Application developers can decide if immediate user attention is required, and then can present directly or indirectly generate visual feedback that complements the degree of urgency. Alternatively, if the user requires less important, informational feedback, perhaps on the stalled status of a process, then a visual state that denotes less importance can be presented.

Aspects of this invention provide a window management system to change a visual state of an application window representation. The method includes steps of displaying an application window representation with a default visual state and changing the default visual state of the application window representation to one of at least two different visual states. The entirety of the application window representation or a portion of the application window representation may have a change to its visual state. The visual states may be a change in color, pattern, and/or texture. A group of visual states may correlate to an animation.

Another aspect of the invention employs a plurality of visual states of an application window representation to correlate to an animation. An implementation may illustrate a gradual introduction of color that permeates across the application window representation. The animation may be akin to a flush response in human skin, in response to a change in a person's emotional state. The application window representation may recreate the visual effect of a blushing response as applied to a graphical user interface.

BRIEF DESCRIPTION OF THE DRAWINGS

The foregoing summary of the invention, as well as the following detailed description of illustrative embodiments, is better understood when read in conjunction with the accompanying drawings, which are included by way of example, and not by way of limitation with regard to the claimed invention.

FIGS. 4A-4B illustrate other examples of a window management system including animated changes in a visual state of an application window in accordance with at least one of the present invention;

FIGS. 5A-5B illustrate still other examples of a window management system including changes in a visual state of an application window by resizing the application window in accordance with at least one aspect of the present invention;

FIG. 6A illustrates a conventional taskbar region including an application notification;

FIGS. 6B-6C illustrate examples of a window management system including changes in a visual state of an application window tile in a predefined control region in accordance with at least one aspect of the present invention;

FIG. 7 is a flowchart of an illustrative example of a method for changing a visual state of a frame of an application window in accordance with at least one aspect of the present invention;

FIG. 9 is a flowchart of an illustrative example of a method for changing a visual state of an application window tile in a predetermined control region in accordance with at least one aspect of the present invention.

DETAILED DESCRIPTION OF ILLUSTRATIVE EMBODIMENTS

In the following description of various illustrative embodiments, reference is made to the accompanying drawings, which form a part hereof, and in which is shown, by way of illustration, various embodiments in which the invention may be practiced. It is to be understood that other embodiments may be utilized and structural and functional modifications may be made without departing from the scope of the present invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing system environment 100 be interpreted as having any dependency nor requirement relating to any one or combination of components illustrated in the exemplary computing system environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 1A:
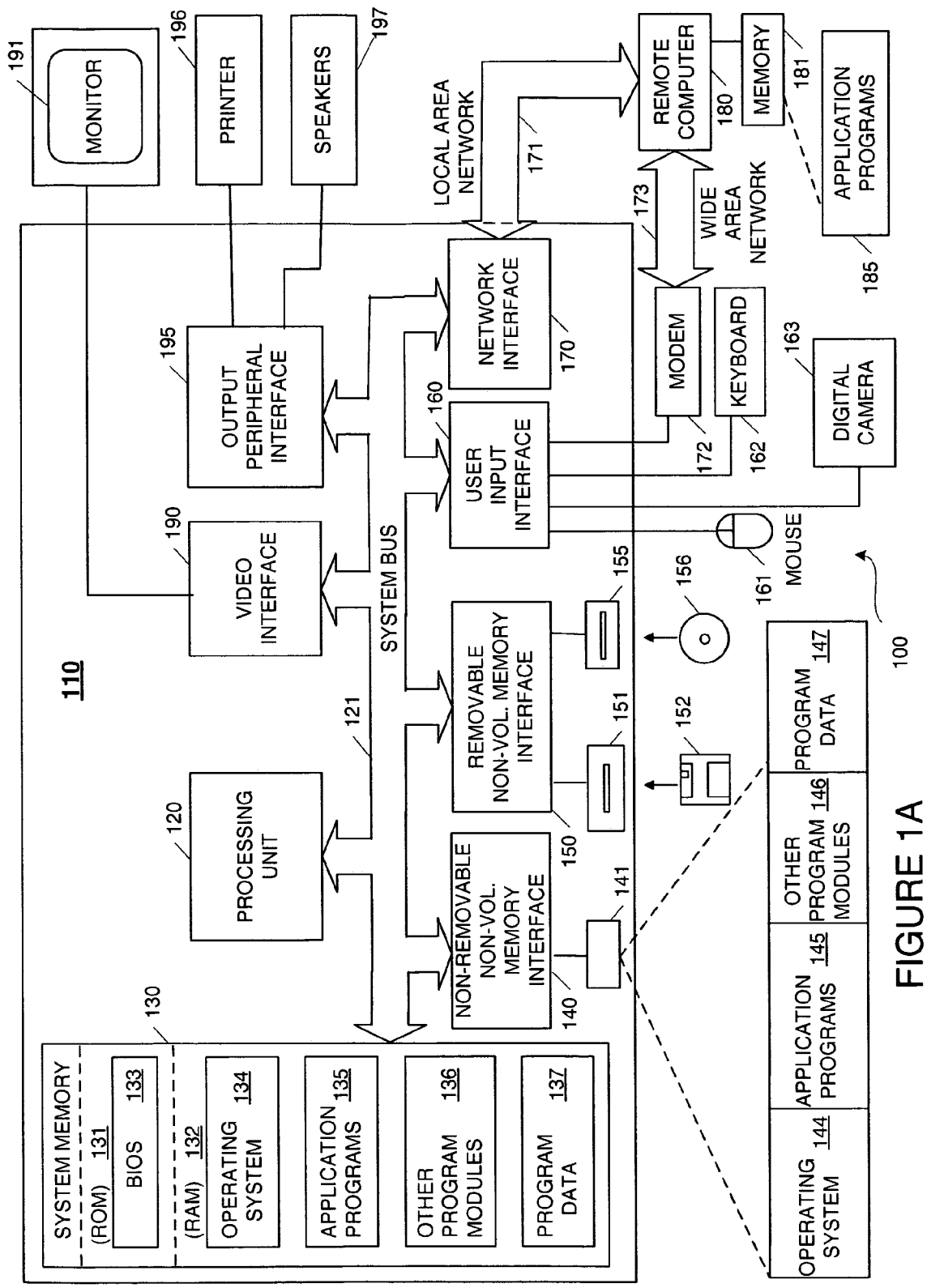
FIG. 1A illustrates a schematic diagram of a general-purpose digital computing environment in which certain aspects of the present invention may be implemented.

With reference to FIG. 1A, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media, such as acoustic, RF, infrared and other wireless media. Combinations of the any of the above should also be included within the scope of computer readable media.

The system memory 130 includes computer storage media in the form of volatile and/or nonvolatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1A illustrates operating system 134, application programs 135, other program modules 136, and program data 137.

The computer 110 may also include other removable/non-removable, volatile/nonvolatile computer storage media. By way of example only, FIG. 1A illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disc drive 155 are typically connected to the system bus 121 by a removable memory interface, such as interface 150.

The drives and their associated computer storage media discussed above and illustrated in FIG. 1A, provide storage of computer readable instructions, data structures, program modules and other data for the computer 110. In FIG. 1A, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a digital camera 163, a keyboard 162, and pointing device 161, commonly referred to as a mouse, trackball or touch pad. Other input devices (not shown) may include a pen, stylus and tablet, microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1A. The logical connections depicted in FIG. 1A include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LA 171 through a network interface or adapter 170. When used in a WAN networking environment, the computer 110 typically includes a modem 172 or other means for establishing communications over the WA 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1A illustrates remote application programs 185 as residing on memory device 181. It will be appreciated that the network connections shown are exemplary and other means of establishing a communications link between the computers may be used.

It will be appreciated that the network connections shown are exemplary and other means of establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

A programming interface (or more simply, interface) may be viewed as any mechanism, process, protocol for enabling one or more segment(s) of code to communicate with or access the functionality provided by one or more other segment(s) of code. Alternatively, a programming interface may be viewed as one or more mechanism(s), method(s), function call(s), module(s), object(s), etc. of a component of a system capable of communicative coupling to one or more mechanism(s), method(s), function call(s), module(s), etc. of other component(s). The term "segment of code" in the preceding sentence is intended to include one or more instructions or lines of code, and includes, e.g., code modules, objects, subroutines, functions, and so on, regardless of the terminology applied or whether the code segments are separately compiled, or whether the code segments are provided as source, intermediate, or object code, whether the code segments are utilized in a runtime system or process, or whether they are located on the same or different machines or distributed across multiple machines, or whether the functionality represented by the segments of code are implemented wholly in software, wholly in hardware, or a combination of hardware and software.

Figure 1B:
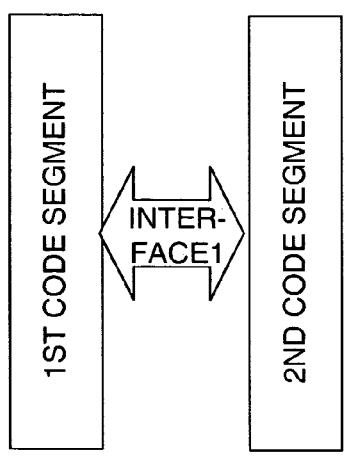
FIGS. 1B through 1M show a general-purpose computer environment supporting one or more aspects of the present invention.
Figure 1C:
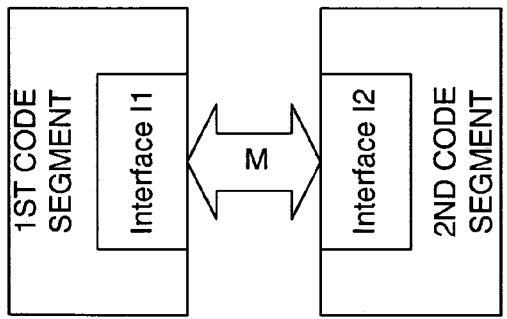

Notionally, a programming interface may be viewed generically, as shown in FIG. 1B or FIG. 1C. FIG. 1B illustrates an interface Interface1 as a conduit through which first and second code segments communicate. FIG. 1C illustrates an interface as comprising interface objects I1 and I2 (which may or may not be part of the first and second code segments), which enable first and second code segments of a system to communicate via medium M. In the view of FIG. 1C, one may consider interface objects I1 and I2 as separate interfaces of the same system and one may also consider that objects I1 and I2 plus medium M comprise the interface. Although FIGS. 1B and 1C show bi-directional flow and interfaces on each side of the flow, certain implementations may only have information flow in one direction (or no information flow as described below) or may only have an interface object on one side. By way of example, and not limitation, terms such as application programming interface (API), entry point, method, function, subroutine, remote procedure call, and component object model (COM) interface, are encompassed within the definition of programming interface.

Aspects of such a programming interface may include the method whereby the first code segment transmits information (where "information" is used in its broadest sense and includes data, commands, requests, etc.) to the second code segment; the method whereby the second code segment receives the information; and the structure, sequence, syntax, organization, schema, timing and content of the information. In this regard, the underlying transport medium itself may be unimportant to the operation of the interface, whether the medium be wired or wireless, or a combination of both, as long as the information is transported in the manner defined by the interface. In certain situations, information may not be passed in one or both directions in the conventional sense, as the information transfer may be either via another mechanism (e.g. information placed in a buffer, file, etc. separate from information flow between the code segments) or non-existent, as when one code segment simply accesses functionality performed by a second code segment. Any or all of these aspects may be important in a given situation, e.g., depending on whether the code segments are part of a system in a loosely coupled or tightly coupled configuration, and so this list should be considered illustrative and nonlimiting.

This notion of a programming interface is known to those skilled in the art and is clear from the foregoing detailed description of the invention. There are, however, other ways to implement a programming interface, and, unless expressly excluded, these too are intended to be encompassed by the claims set forth at the end of this specification. Such other ways may appear to be more sophisticated or complex than the simplistic view of FIGS. 1B and 1C, but they nonetheless perform a similar function to accomplish the same overall result. We will now briefly describe some illustrative alternative implementations of a programming interface.

A. Factoring

Figure 1D:
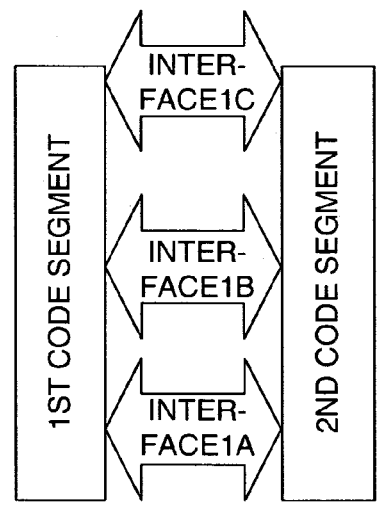
Figure 1E:
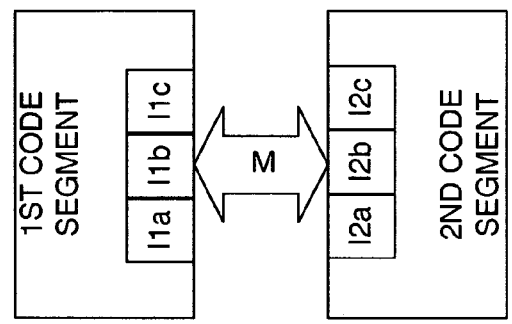

A communication from one code segment to another may be accomplished indirectly by breaking the communication into multiple discrete communications. This is depicted schematically in FIGS. 1D and 1E. As shown, some interfaces can be described in terms of divisible sets of functionality. Thus, the interface functionality of FIGS. 1B and 1C may be factored to achieve the same result, just as one may mathematically provide 24, or 2 times 2 times 3 times 2. Accordingly, as illustrated in FIG. 1D, the function provided by interface Interface1 may be subdivided to convert the communications of the interface into multiple interfaces Interface1A, Interface1B, Interface1C, etc. while achieving the same result. As illustrated in FIG. 1E, the function provided by interface I1 may be subdivided into multiple interfaces I1a, I1b, I1c, etc. while achieving the same result. Similarly, interface I2 of the second code segment which receives information from the first code segment may be factored into multiple interfaces I2a, I2b, I2c, etc. When factoring, the number of interfaces included with the 1st code segment need not match the number of interfaces included with the 2nd code segment. In either of the cases of FIGS. 1D and 1E, the functional spirit of interfaces Interface1 and I1 remain the same as with FIGS. 1B and 1C, respectively. The factoring of interfaces may also follow associative, commutative, and other mathematical properties such that the factoring may be difficult to recognize. For instance, ordering of operations may be unimportant, and consequently, a function carried out by an interface may be carried out well in advance of reaching the interface, by another piece of code or interface, or performed by a separate component of the system. Moreover, one of ordinary skill in the programming arts can appreciate that there are a variety of ways of making different function calls that achieve the same result.

B. Redefinition

Figure 1F:
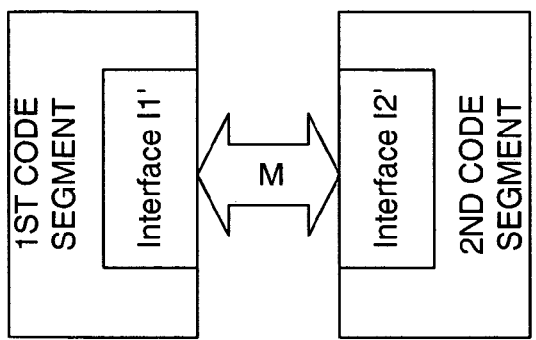
Figure 1G:
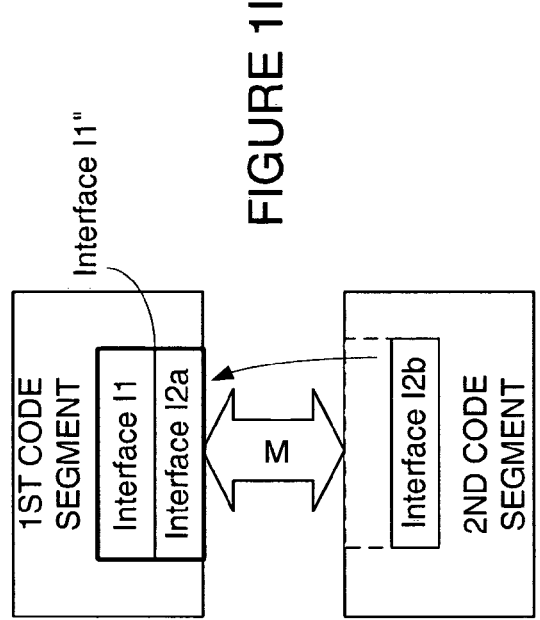

In some cases, it may be possible to ignore, add or redefine certain aspects (e.g., parameters) of a programming interface while still accomplishing the intended result. This is illustrated in FIGS. 1F and 1G. For example, assume interface Interface1 of FIG. 1B includes a function call Square (input, precision, output), a call that includes three parameters, input, precision and output, and which is issued from the 1st Code Segment to the 2nd Code Segment. If the middle parameter precision is of no concern in a given scenario, as shown in FIG. 1F, it could just as well be ignored or even replaced with a meaningless (in this situation) parameter. One may also add an additional parameter of no concern. In either event, the functionality of square can be achieved, so long as output is returned after input is squared by the second code segment. Precision may very well be a meaningful parameter to some downstream or other portion of the computing system; however, once it is recognized that precision is not necessary for the narrow purpose of calculating the square, it may be replaced or ignored. For example, instead of passing a valid precision value, a meaningless value such as a birth date could be passed without adversely affecting the result. Similarly, as shown in FIG. 1G, interface I1 is replaced by interface I1', redefined to ignore or add parameters to the interface. Interface I2 may similarly be redefined as interface I2', redefined to ignore unnecessary parameters, or parameters that may be processed elsewhere. The point here is that in some cases a programming interface may include aspects, such as parameters, which are not needed for some purpose, and so they may be ignored or redefined, or processed elsewhere for other purposes.

C. Inline Coding

Figure 1H:
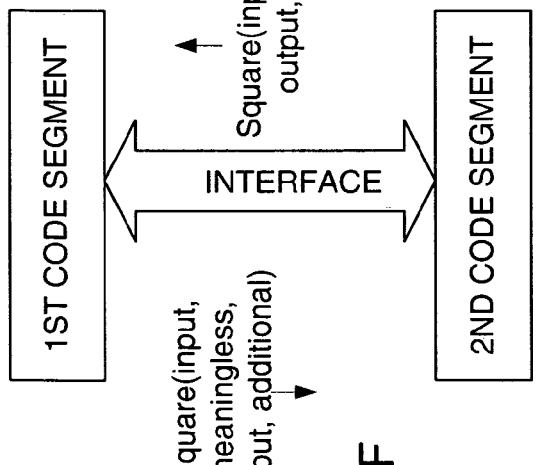
Figure 1I:
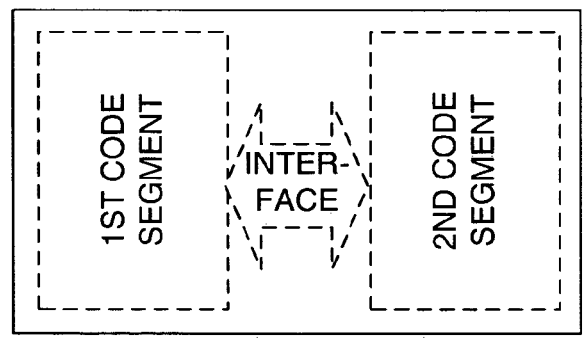

It may also be feasible to merge some or all of the functionality of two separate code modules such that the "interface" between them changes form. For example, the functionality of FIGS. 1B and 1C may be converted to the functionality of FIGS. 1H and 1I, respectively. In FIG. 1H, the previous 1st and 2nd Code Segments of FIG. 1B are merged into a module containing both of them. In this case, the code segments may still be communicating with each other but the interface may be adapted to a form which is more suitable to the single module. Thus, for example, formal Call and Return statements may no longer be necessary, but similar processing or response(s) pursuant to interface Interface1 may still be in effect. Similarly, shown in FIG. 1I, part (or all) of interface I2 from FIG. 1C may be written inline into interface I1 to form interface I1". As illustrated, interface I2 is divided into I2a and I2b, and interface portion I2a has been coded in-line with interface I1 to form interface I1". For a concrete example, consider that the interface I1 from FIG. 1C performs a function call square (input, output), which is received by interface I2, which after processing the value passed with input (to square it) by the second code segment, passes back the squared result with output. In such a case, the processing performed by the second code segment (squaring input) can be performed by the first code segment without a call to the interface.

D. Divorce

Figure 1K:
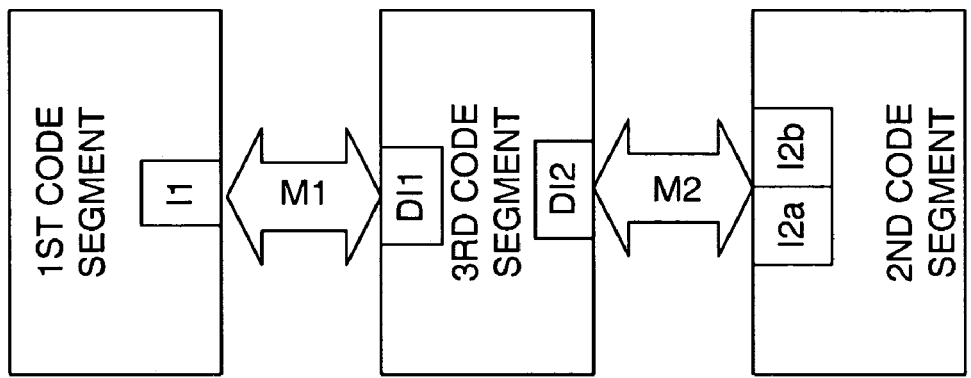
Figure 1J:
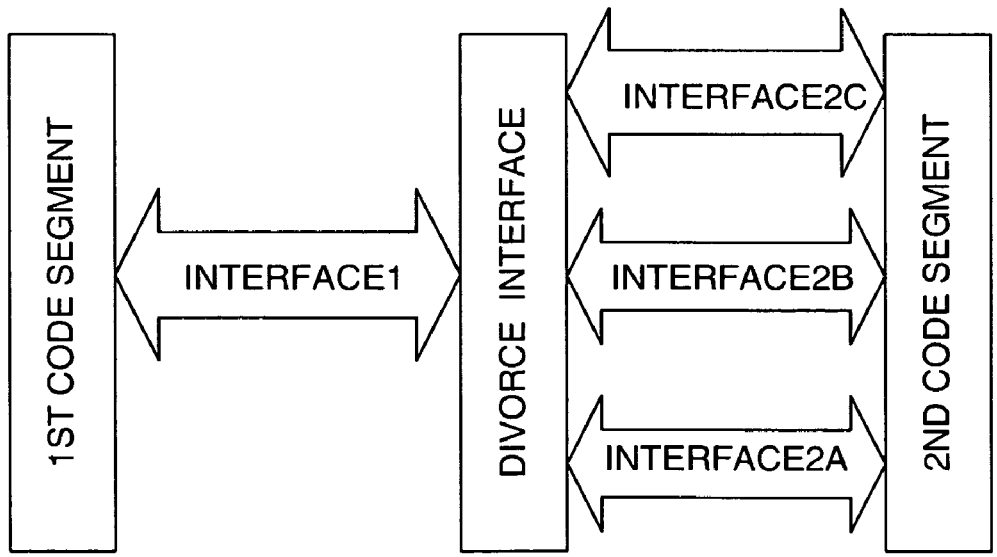

A communication from one code segment to another may be accomplished indirectly by breaking the communication into multiple discrete communications. This is depicted schematically in FIGS. 1J and 1K. As shown in FIG. 1J, one or more piece(s) of middleware (Divorce Interface(s), since they divorce functionality and/or interface functions from the original interface) are provided to convert the communications on the first interface, Interface1, to conform them to a different interface, in this case interfaces Interface2A, Interface2B and Interface2C. This might be done, e.g., where there is an installed base of applications designed to communicate with, say, an operating system in accordance with an Interface1 protocol, but then the operating system is changed to use a different interface, in this case interfaces Interface2A, Interface2B and Interface2C. The point is that the original interface used by the 2nd Code Segment is changed such that it is no longer compatible with the interface used by the 1st Code Segment, and so an intermediary is used to make the old and new interfaces compatible. Similarly, as shown in FIG. 1K, a third code segment can be introduced with divorce interface DI1 to receive the communications from interface I1 and with divorce interface DI2 to transmit the interface functionality to, for example, interfaces I2a and I2b, redesigned to work with DI2, but to provide the same functional result. Similarly, DI1 and DI2 may work together to translate the functionality of interfaces I1 and I2 of FIG. 1C to a new operating system, while providing the same or similar functional result.

E. Rewriting

Figure 1L:
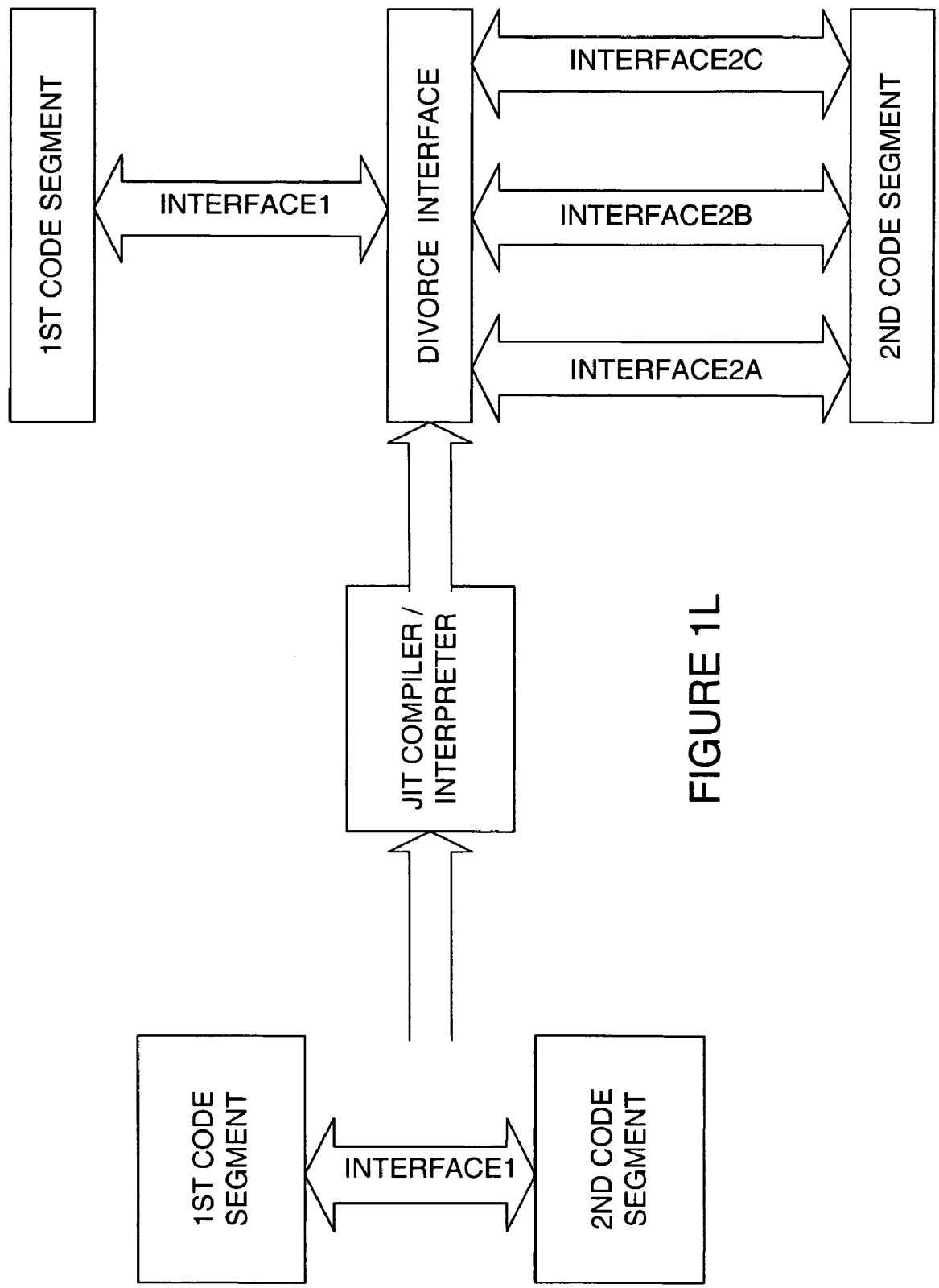
Figure 1M:
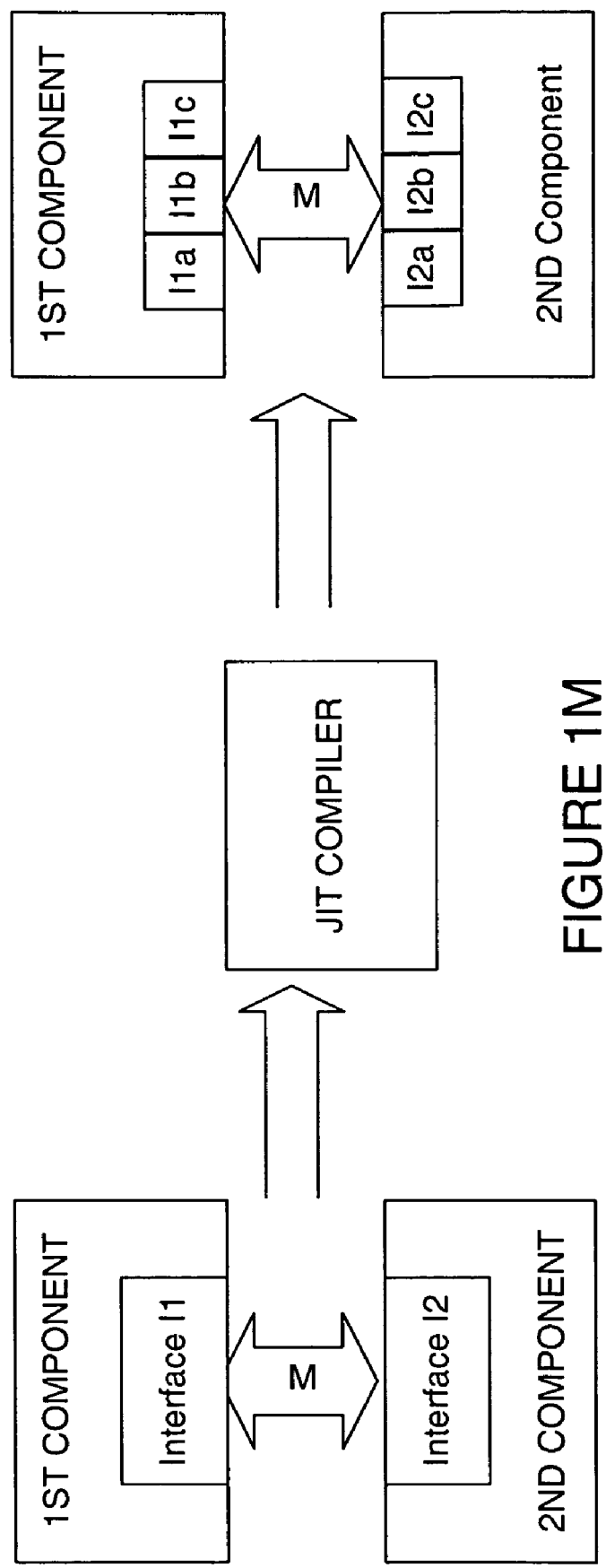

Yet another possible variant is to dynamically rewrite the code to replace the interface functionality with something else but which achieves the same overall result. For example, there may be a system in which a code segment presented in an intermediate language (e.g. Microsoft IL, Java ByteCode, etc.) is provided to a Just-in-Time (JIT) compiler or interpreter in an execution environment (such as that provided by the .Net framework, the Java runtime environment, or other similar runtime type environments). The JIT compiler may be written so as to dynamically convert the communications from the 1st Code Segment to the 2nd Code Segment, i.e., to conform them to a different interface as may be required by the 2nd Code Segment (either the original or a different 2nd Code Segment). This is depicted in FIGS. 1L and 1M. As can be seen in FIG. 1L, this approach is similar to the Divorce scenario described above. It might be done, e.g., where an installed base of applications are designed to communicate with an operating system in accordance with an Interface1 protocol, but then the operating system is changed to use a different interface. The JIT Compiler could be used to conform the communications on the fly from the installed-base applications to the new interface of the operating system. As depicted in FIG. 1M, this approach of dynamically rewriting the interface(s) may be applied to dynamically factor, or otherwise alter the interface(s) as well.

It is also noted that the above-described scenarios for achieving the same or similar result as an interface via alternative embodiments may also be combined in various ways, serially and/or in parallel, or with other intervening code. Thus, the alternative embodiments presented above are not mutually exclusive and may be mixed, matched and combined to produce the same or equivalent scenarios to the generic scenarios presented in FIGS. 1B and 1C. It is also noted that, as with most programming constructs, there are other similar ways of achieving the same or similar functionality of an interface which may not be described herein, but nonetheless are represented by the spirit and scope of the invention, i.e., it is noted that it is at least partly the functionality represented by, and the advantageous results enabled by, an interface that underlie the value of an interface.

Figure 2A:
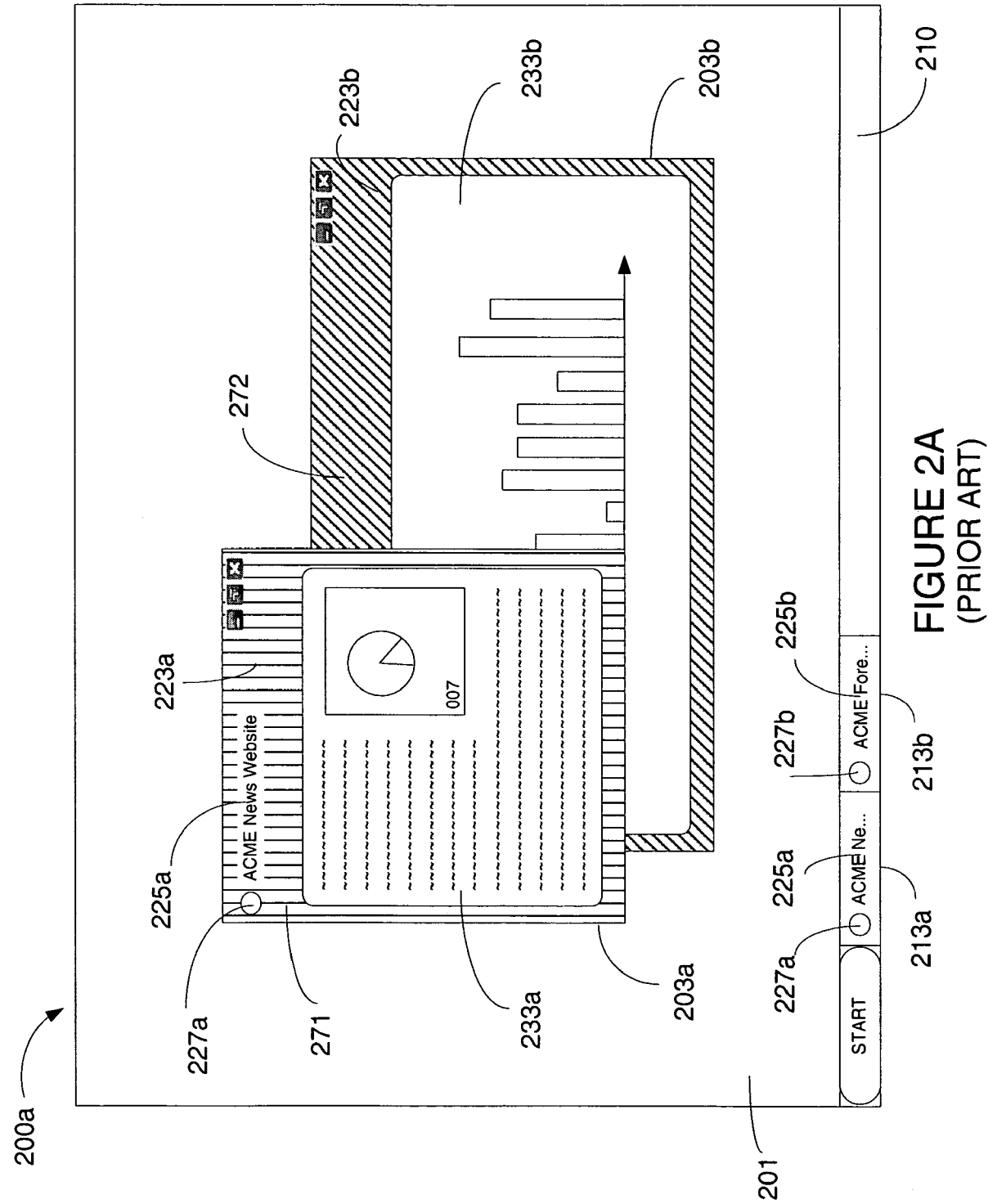
FIGS. 2A-2B illustrate a conventional window management scenario.

FIG. 2A illustrates a conventional window management scenario 200a common to graphical user interface systems. As shown, application window 203b is partially obscured by application window 203a that is positioned in front. Specifically, FIG. 2A shows a scenario 200a of two windows 203a and 203b in a Z-order configuration in which application window 203a is higher in the Z-order than application window 203b. Application windows 203a-203b are shown within a desktop space 201. As used herein, an application window representation includes an application window itself, an application window tile in a predefined control region, an icon displayed within the desktop space, and a thumbnail displayed within the desktop space.

As shown in FIG. 2A, the application window at the top of Z-order is active and the underlying application windows are inactive. Desktop space 201 is an area or region of a display that allows for the display of application windows corresponding to application programs. A taskbar 210 at the bottom of the display serves as a control region that indicates the application windows that are currently in use including application windows that are displayed in the desktop space 201 as well as any minimized application windows. The taskbar 210 is a specific implementation of an on-screen window remote control used to list and enable manipulation of application windows, such as activating, moving, hiding, and minimizing.

Window 203a is represented by taskbar button 213a, and window 203b is represented by taskbar button 213b. As shown in this example, the application windows 203a-203b are shown in the desktop space 201. The file name 225a of the content 233a of application window 203a is shown along the title bar area 223a of the application window 203a. The file name 225b of the content 233b of application window 203b is completely obscured by application window 203a. Each file name may be generated by the application program operating the application window and/or may be customizable by a user. The same file name 225a-225b for each application window 203a-203b is shown in the corresponding taskbar buttons 213a-213b. Application windows 203a-203b and taskbar buttons 213a-213b include an application icon identifier 227a-227b to allow a user to identify the type of application program running the respective application window. Application icon identifier 227b is obscured for application window 203b although shown for its corresponding taskbar button 213b.

Application windows 203a-203b are used by application programs to display content 233a and 233b, respectively, to a user. Application windows 203a and 203b each include a frame or border portion 223a and 223b and a content portion 233a and 233b respectively. The frame 223a of the application window 203a may be configured in a number of different types and styles. Further, the frame 223a may be configured to only be shown around the top of the application window 203a and/or one or more other sides of the application window 203a.

As shown in FIG. 2A, application window frame 223a of application window 203a is shown in a visual state 271 by a vertical line pattern. It should be understood that the vertical line pattern is merely illustrative of the difference in the visual states between application window 203a and 203b. Frame 223b of application window 203b is shown in a visual state 272 by a slanted line pattern running from an upper right to a lower left position. Again, it should be understood by those skilled in the art that the slanted line pattern is merely illustrative of the difference in the visual states between application windows 203a and 203b. FIG. 2A illustrates an example of when application window 203a is in an active visual state and application window 203b is in an inactive visual state. The difference in the visual states may be that both application windows 203a and 203b are blue in color, but that application window frame 223a is a brighter blue than that of application window frame 223b. It should be understood that an active application window is one that is currently in use by a user while an inactive application window must be accessed in some manner in order to become active.

The application program associated with application window 203a may be a different application program or the same application program corresponding to application window 203b. Each of application windows 203a-203b is independent of and external to the other windows 203a-203b. As used herein, a first application window is external to a second application window when the first application window is not contained within the second application window and the second application window is not contained within the first application window. It should be understood that a first window is not contained in a second application window if the two application windows merely overlap.

Figure 2B:
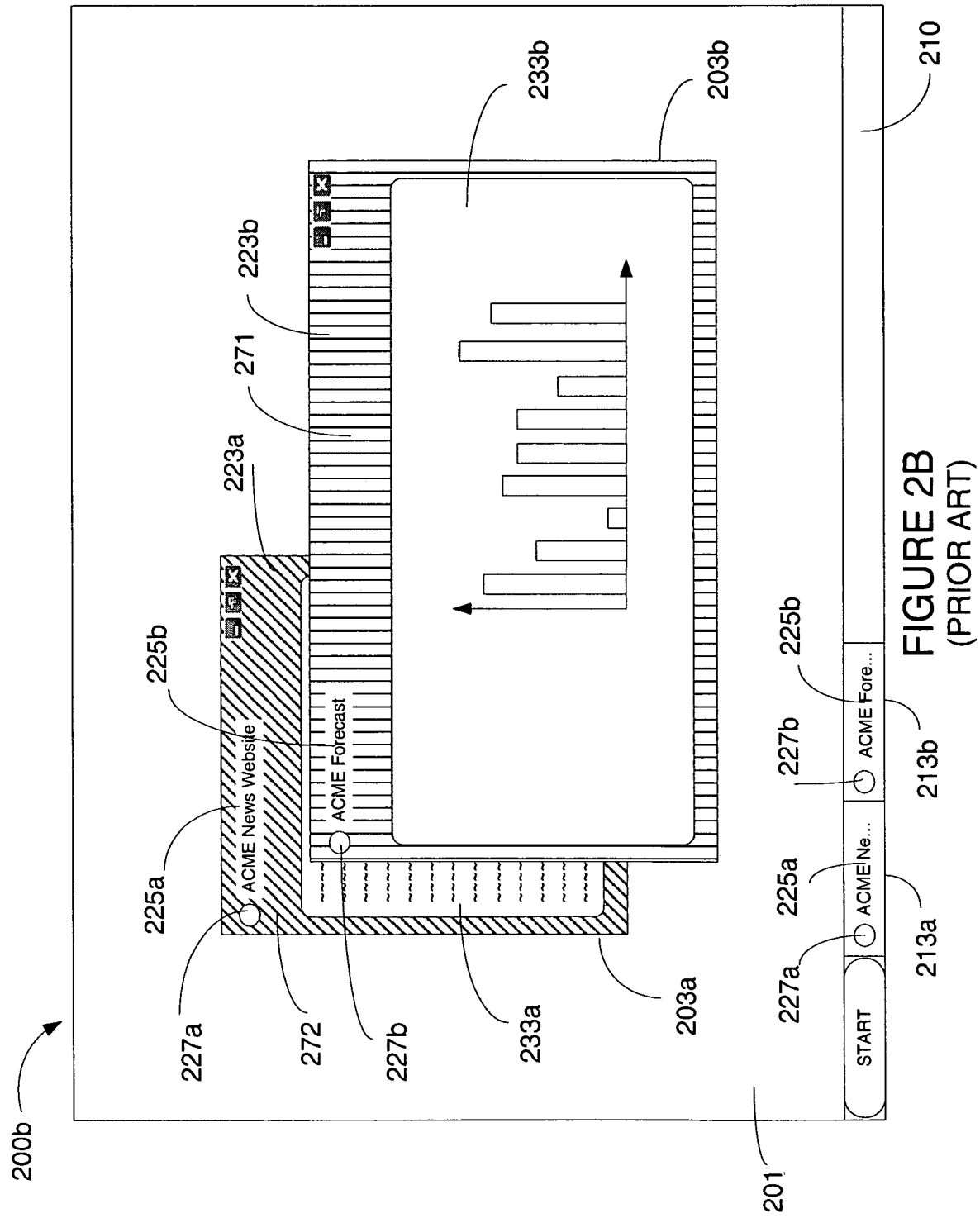

FIG. 2B illustrates a conventional window management scenario 200a common to graphical user interface systems. FIG. 2B occurs when a user decides to make application window 203b the active window, automatically making application window 203a inactive. As shown, application window 203a is partially obscured by application window 203b that is positioned in front. Specifically, FIG. 2B shows application window frame 223b of application window 203b in an active visual state 271 and application window frame 223a of application window 203a in an inactive visual state 272. A user may switch between application windows 203a and 203b to make one or the other active by accessing the application window 203 or 203b itself or by accessing the corresponding taskbar button 213a or 213b. In either manner, by accessing a particular application window or taskbar button, all other application windows and taskbar buttons become inactive. It should be understood by those skilled in the art that the number of application windows shown is merely illustrative and that any number of application windows may be open at a time including those presented on the desktop space 201 and minimized application windows as well. Still further, it should be understood that under a conventional system, the taskbar buttons 213a and 213b may have a visual state corresponding to whether the corresponding application window is active or inactive.

Figure 3A:
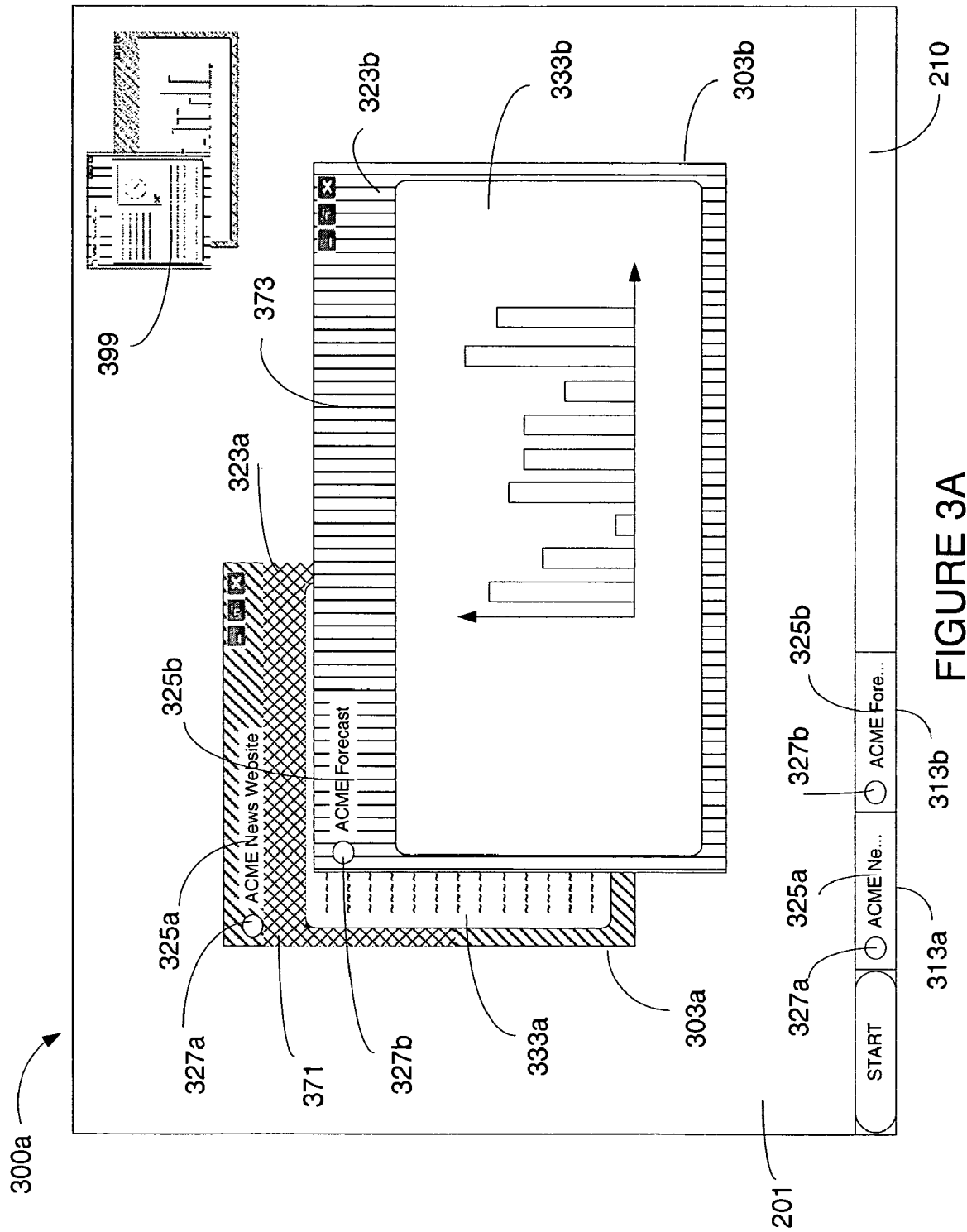
FIGS. 3A-3C illustrate examples of a window management system including changes in a visual state of an application window in accordance with at least one aspect of the present invention.
Figure 3B:
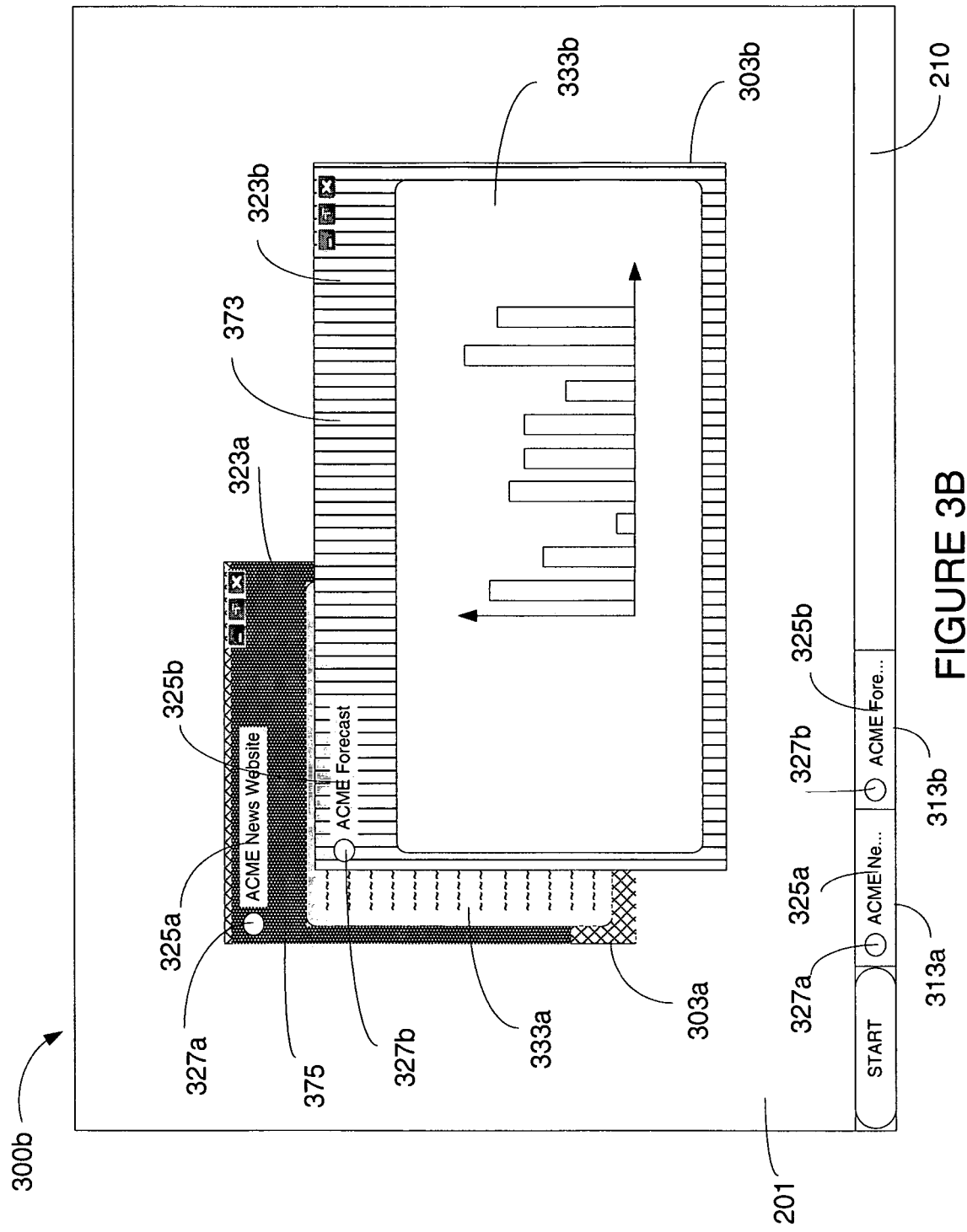
Figure 3C:
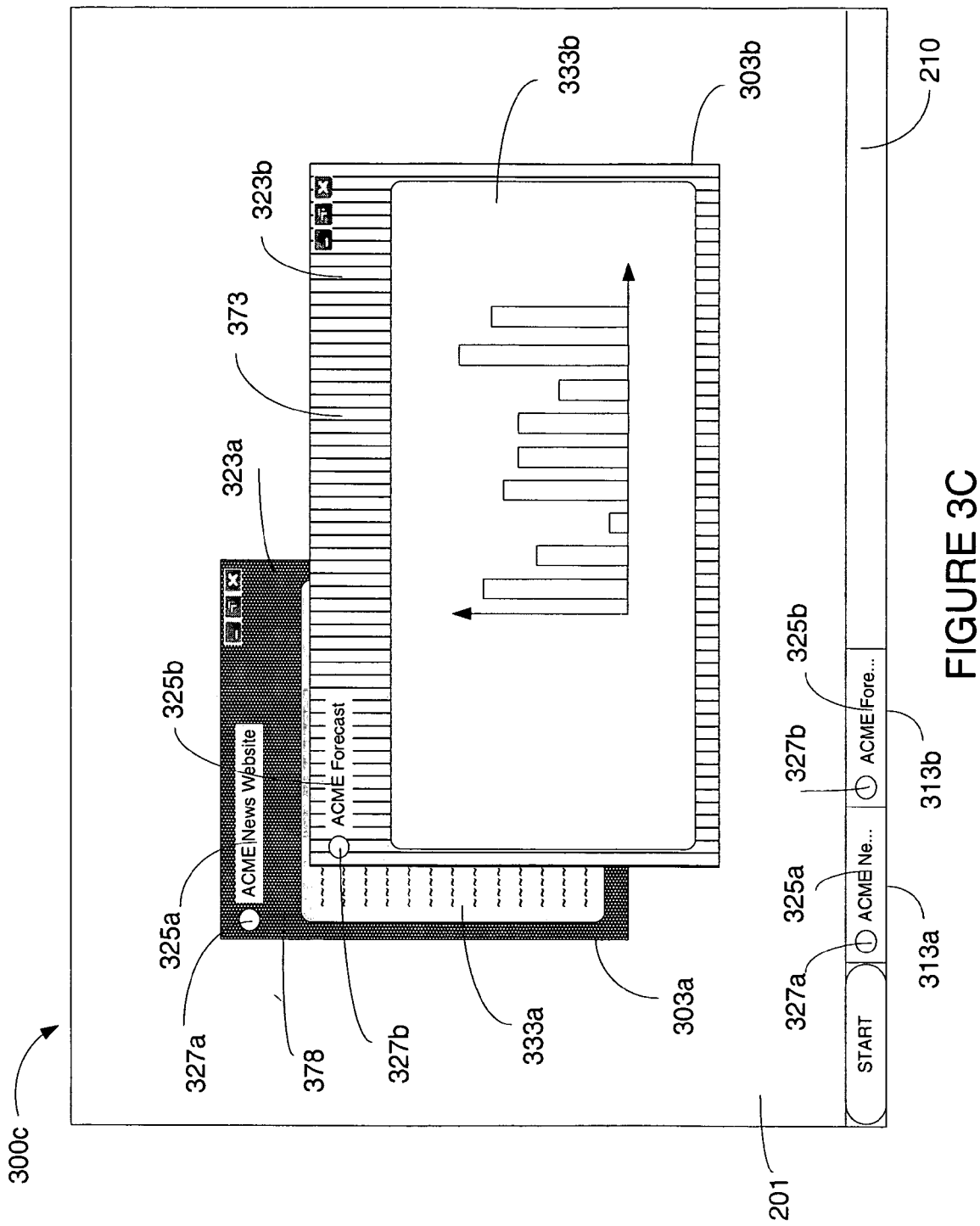

As shown in FIG. 3A-3C, in accordance with aspects of the present invention, a window management scenario 300a-300c is provided to illustrate changing visual states of an application window 303a. With respect to FIG. 3A, within desktop space 201, application windows 303a and 303b are shown in a Z-order configuration in which application window 303b is higher in the Z-order than application window 303a. In a predefined control region 210, application window tiles 313a and 313b are shown corresponding to application windows 303a and 303b respectively. As shown in FIG. 3A, application window tiles 313a and 313b are shown as taskbar buttons. It should be understood by those skilled in the art that other application window representations may be used and that a taskbar button configuration is but one example. For example, an application window and/or group of application windows may be represented by an icon or thumbnail 399.

The file names 325a and 325b are shown along the title bar area of the frames 323a and 323b of the respective application windows 303a and 303b as well as in the application window tiles 313a and 313b. Application windows 303a-303b and application window tiles 313a-313b each include an application icon identifier 327a-327b to allow a user to identify the type of application program running the respective application window. Application windows 303a-303b are used by application programs to display content 333a and 333b, respectively, to a user. Application windows 303a and 303b each include a frame or border portion 323a and 323b and a content portion 333a and 333b respectively. Frame 323a of application window 303a may be configured in a number of different types and styles. Further, frame 323a may be configured to only be shown around the top of the application window 303a and/or one or more other sides of application window 303a.

As shown in FIG. 3A, application window frame 323b of application window 303b is shown in a visual state 373 by a vertical line pattern. It should be understood that the vertical line pattern is merely illustrative of the difference in the visual states between application window 303a and 303b. Frame 323a of application window 303a is shown with a visual state 371. Visual state 371 is shown by a slanted line pattern running from an upper right to a lower left position and by a crisscross pattern. It should be understood by those skilled in the art that the slanted line pattern and crisscross pattern are merely illustrative of the difference in the visual states between application windows 303a and 303b.

FIG. 3A illustrates an example of a system of application windows to express a broad range of application window visual states. As shown, application window 303a may change visual states in accordance with a default operation of the operating system, a default operation of the application program operating the application window, or a user defined configuration. For example, FIG. 3A may illustrate an example of a visual state 371 of an application window 303a that gradually changes color over time.

In one example, application window 303a may represent a schedule notification window that informs a user of an upcoming schedule appointment. FIG. 3A may be shown when the user is within 30 minutes of the scheduled appointment. The color of frame 323a may turn from a blue color to a blue color with some red color as well. For example, the slanted line pattern running from an upper right to a lower left position of visual state 371 may be the blue color, while the crisscross pattern of visual state 371 may be the red color. If working on another project, the visual state change allows a user to be notified of the state change of the application window 303a. Within 15 minutes of the scheduled event, the visual state of the application window frame 323a may change again. FIG. 3B as described below shows such an example. In such a case, the color of the frame 323a may change again to include more red color. Finally, within 5 minutes of the scheduled event, the visual state may change an additional time. Such an example is shown and described in FIG. 3C. In such a case, the entire frame 323a may change to be a dark red color.

FIG. 3B shows an example scenario 300b in which the visual state of frame 323a of application window 303a has changed to another visual state. As shown in the example of FIG. 3B, frame 323a of application window 303a is shown with a visual state 375. Visual state 375 is shown by a crisscross pattern along a very top portion of frame 323a as well as the bottom of the frame 323a and by a small honeycomb pattern for the remainder of the frame 323a. FIG. 3B may be an example of a situation in which application window 303a employs an animation akin to a human blush response. The change in the visual state of the application window 303a may be an animation that introduces a visual treatment, e.g., a color or pattern over time that permeates a portion of application window frame 323a.

FIG. 3C shows an example scenario 300c in which the visual state of frame 323a of application window 303a has changed to another visual state. As shown in the example of FIG. 3C, frame 323a is shown in a visual state 378. Visual state 378 is shown represented by a small honeycomb pattern. Visual state 378 may be the same as the small honeycomb pattern shown in the portion of visual state 375 shown in FIG. 3B; however, it is now over the entire application window frame 323a. Visual state 378 may also represent an entirely different state. FIG. 3C may be an example of a situation in which application window 303a employs an animation akin to a human blush response. The change in the visual state of the application window 303a may be an animation that introduces a visual treatment, e.g., a color or pattern over time that permeates the entirety of application window frame 323a.

It should be understood by those skilled in the art that the example patterns shown are merely illustrative of the differences in appearances that may occur and that the present invention is not so limited to the examples shown herein. As described below with reference to FIGS. 4A and 4B, other visual states may occur. It should be understood further by those skilled in the art that aspects of the present invention are not limited to the number of application windows shown in the Figures and that any number of different application windows may be created.

FIGS. 4A-4B illustrate other examples of a window management system including animated changes in a visual state of an application window 403 in accordance with at least one aspect of the present invention. FIG. 4A illustrates an example scenario 400a in which one application window 403 is shown in a desktop space 201 with a corresponding application window tile 413 shown in a predefined control region 210. It should be understood that the use of one application window in FIGS. 4A-5B is merely illustrative and that additional windows may be employed. Further, although shown with respect to an application window and application window tile, other types of application window representations may be used with aspects of the present invention. The file name 425 is shown on the application window tile 413 as well as an application icon identifier 427. Similar to the application windows described in FIGS. 3A-3C, application window 403 includes a content area 433 and a frame 423. As shown, frame 423 includes a narrow border around each side and the bottom of the application window 403 in comparison to the top of the application window 403.

FIG. 4A represents another example of a visual state 481a in which a visual state is shown. For purposes of this application, an application window representation includes one of at least three different visual states. For example, an application window may be configured to include three or more possible states for its visual state, such as a default state, a first state, and a second state. Further, one visual state may be a transition in intensity of another visual state. For example, a visual state may increase in brightness of a color, such as the color red. The visual state may be correlated to time to indicate the degree of brightness of the red color being displayed. Any number of additional visual states besides for three different possible visual states may occur and the present invention is not limited to the number of states described herein.

Returning to FIG. 4A, application window 403 is shown in a visual state 481a in which bubbles are shown. The bubbles of the visual state 481a may be few in number at this point in an animation. Proceeding to FIG. 4B, example scenario 400b illustrates how the number of bubbles may increase as shown in visual state 481b. The bubbles animation may be a default animation or one configured by a user to alert a user to an event associated with application window 403. The animation of the bubbles may include a transition of the visual state of the application window 403 to and from visual states 481a and 481b or additional visual states may be included. It should be understood that a number of different events may be correlated to an application window, such as an alert to an error associated with the application window, a new email notification, a new message notification, a completion of a download, a progress of a saving operation, and many others. The present invention is not so limited to any particular notifications.

Still further, the animation of bubbles shown in FIGS. 4A and 4B are merely illustrative of one type of animation of visual states and that the present invention is not so limited. Any number of different effects may be used. Some examples of different effects includes, an application window with a glass appearance in which the glass begins to crack and break over time, an appearance in which the application window frame appears to melt, an appearance in which the application window frame begins to rust, get boils or blotches, change colors, changes textures, and an appearance in which the application window frame is distorted, e.g., warbles, blurs, fades. These are but some examples of the number of different visual states of an application window representation. An operating system or application program may allow a user to configure a desired effect for the visual state notifications and/or provide a default scenario for notifications.

FIGS. 5A-5B illustrate still other examples of a window management system including changes in a visual state of an application window by resizing the application window in accordance with at least one aspect of the present invention. FIG. 5A illustrates an example scenario 500a in which one application window 503 is shown in a desktop space 201 with a corresponding application window tile 513 shown in a predefined control region 210. The file name 525 is shown on the application window tile 513 as well as an application icon identifier 527. Similar to the application windows described in FIGS. 4A-4B, application window 503 includes a content area 533 and a frame 523. As shown, frame 523 includes a narrow border around each side and the bottom of the application window 503 in comparison to the top of the application window 503.

In FIG. 5A, application window 503 is shown in a visual state in which application window 503 has a certain size 583a. Proceeding to FIG. 5B, example scenario 500b illustrates how the size of the application window 503 may change as shown in visual state 583b. An animation to adjust the size of the application window 503 may be used to alert a user to an event associated with application window 503. Again, it should be understood by those skilled in the art that further adjustments to the size of the application window 503 may be made as part of an overall animation process. In addition, it should be understood that the visual state of an application window may include any one of these examples in combination. For example, the visual state of an application window may change color and include the introduction of bubbles from the application window frame. The present invention may include one or more of these visual state appearances.

FIG. 6A illustrates a conventional taskbar region 210 including an application notification 671. As shown in FIG. 6A, a scenario 600a shows an application window tile 613 in a taskbar region 210. Taskbar button 613 has a predefined length 683a. Application window tile 613 is shown in a state in which a notification 671 is being made to a user. For example, a notification 671 may be a flashing of the application window tile 613 to indicate a new email message being received. A notification may cause a color change to the application window tile 613 to attempt to attract the attention of the user. However, any notification 671 made with respect to an application window tile 613 is only a state change between a default state and a flash of a color state. There is no third visual state that may be associated with the level of attention the application program corresponding to the application window and application window tile 613 wants to express.

FIGS. 6B-6C illustrate examples of a window management system including a visual state of an application window tile 623 in a predefined control region 210 in accordance with at least one aspect of the present invention. As shown in example scenario 600b, the size 683b of application window tile 623 may be adjusted based upon the level of notification to provide to a user. For example, the size 683b of application window tile 623 may slowly increase over time in an attempt to attract the user to the desired notification. As shown in example scenario 600c in FIG. 6C, other visual states of the application window tile may include an animation 691 that may correlate the intensity of the animation, e.g., the number of bubbles, to the level of attention desired by the application program corresponding to the application window tile 623. Alternatively or concurrently, a visual state to the application window tile 623 may be a color change, texture change, or pattern change 692. The visual state of the application window tile 623 may change over time. The change may be to a portion of the application window tile 623 and/or the entirety of the application window tile 623. Other application window representations may be configured to have visual states change as well, such as icons and thumbnails. It should be understood by those skilled in the art that the described visual states of the application window representations are merely illustrative examples and that a number of different visual states may be used. Further, the visual state of an application window representation may be configured to change by an operating system, by an application program corresponding to the application window representation, and/or based upon a user configured option.

FIG. 7 is a flowchart of an illustrative example of a method for changing a visual state of a frame of an application window in accordance with at least one aspect of the present invention. The process starts at step 701 where a command is received to launch an application window. At step 703, a default visual state is applied to the frame of the application window and the application window with its corresponding default visual state is displayed at step 705. Moving to step 707, a determination is made as to whether a command has been received to launch another application window. If a command is received, the process returns to step 701 to repeat steps 701-705 for the new application window. If a command is not received at step 707, the process proceeds to step 709 where a command is received corresponding to a change in the visual state of one of the application window. The command may be initiated by a notification being received with respect to the corresponding application program associated with the application window.

Proceeding to step 711, the visual state associated with the command is determined. For example, the associated visual state may correlate to a slight increase of the color red to a portion of the application window frame. At step 713, a determination is made as to whether the associated visual state is a first visual state. For example, a first visual state may only be used when the attention of the user is considered critical to the application program associated with the application window. If the associated visual state is a first visual state, at step 715 another determination is made as to whether a user configuration is associated with the first visual state. For example, a user may have a theme for her application window notification, such as the display of bubbles so that more bubbles are animated for one visual state compared to another visual state. If no user configuration exists, the process moves to step 717 where the visual state of at least a portion of the frame of the application window is changed to a first visual state in accordance with a default configured format. If a user configuration does exist at step 715, the process proceeds to step 719 where the visual state of at least a portion of the frame of the application window is changed to a first visual state in accordance with the user configured format.

If the associated visual state is not a first visual state in step 713, the process proceeds to step 721 where another determination is made as to whether a user configuration is associated with the second visual state. For example, a user may have a theme for her application window notification, such as the display of bubbles so that more bubbles are animated for one visual state compared to another visual state. If no user configuration exists, the process moves to step 723 where the visual state of at least a portion of the frame of the application window is changed to a second visual state in accordance with a default configured format. If a user configuration does exist at step 721, the process proceeds to step 725 where the visual state of at least a portion of the frame of the application window is changed to a second visual state in accordance with the user configured format. It should be understood by those skilled in the art although this example shows only a default and two additional visual states, many more visual states may exist and that fact that a first and second visual state after a default visual state is merely illustrative of one example.

Figure 8:
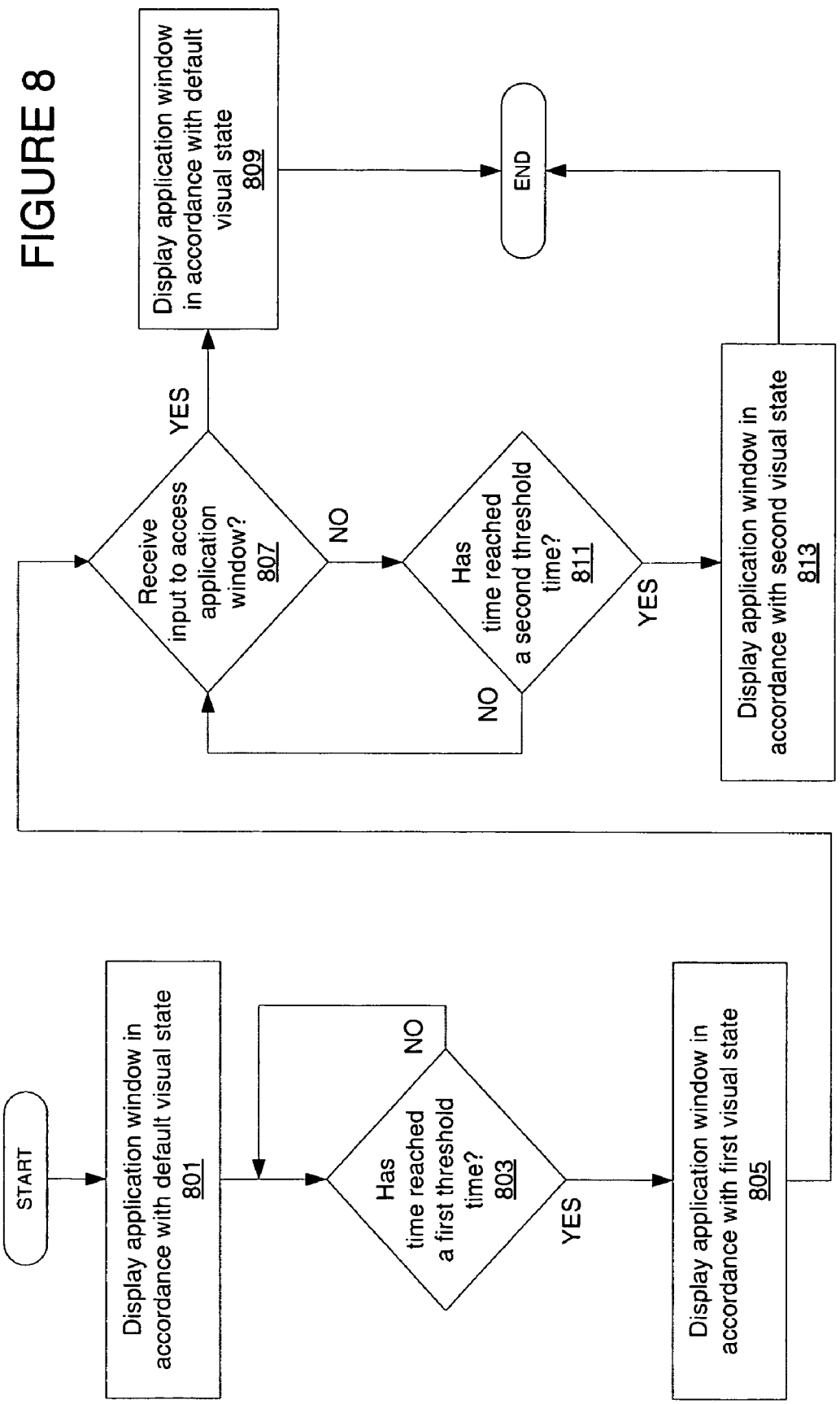
FIG. 8 is a flowchart of an illustrative example of a method for changing a visual state of a frame of an application window over time in accordance with at least one aspect of the aspect invention.

FIG. 8 is a flowchart of an illustrative example of a method for changing a visual state of a frame of an application window over time in accordance with at least one aspect of the present invention. The process starts at step 801 where an application window is displayed with a default visual state in accordance with a default configuration. Such a case may be where an application program or an operating system has a default frame appearance for application windows or a user has a default configuration visual state for application windows. At step 803, a determination is made as to whether time has reached a first threshold time. Such an example may occur when an application program determines that a scheduled appointment is due to occur within one hour. If the first threshold time has not been reached, the process waits until it has. When the first threshold time has been reached, the process proceeds to step 805 where the application window is displayed in accordance with a first visual state. The first visual state may be user configured.

Moving to step 807, a determination is made as to whether an input has been received to access the application window. Such a situation may occur when a user clicks on the application window to make it the active window or the user clicks on another application widow representation, such as an application window tile corresponding to the application window, to make the application window active. Proceeding to step 809, when an input is received to access the application window, the application window may be brought to the top of the Z-order and displayed in accordance with the default visual state. The specific implementation may dismiss the first visual state immediately or remove it in an animation similar to how it was introduced. If an input has not been received at step 807, the process proceeds to step 811 where another determination is made as to whether time has reached a second threshold time. Such an example may occur when an application program determines that a scheduled appointment is due to occur within a few minutes. If not, the process returns to step 807. If the second threshold time has been reached, at step 813, the application window is displayed in accordance with a second visual state. The second visual state also may be user configured. It should be understood that additional threshold times and visual states may be included in accordance with this illustrative example.

FIG. 9 is a flowchart of an illustrative example of a method for changing a visual state of an application window tile in a predetermined control region in accordance with at least one aspect of the present invention. The process starts at step 901 where an application window tile is displayed with a default visual state in accordance with a default configuration. The default configuration may be defined by a user. Such a case may be where an application program or an operating system has a default appearance for application window tiles in a predefined control region of a display screen. At step 903, a determination is made as to whether time has reached a first threshold time. If the first threshold time has not been reached, the process waits until it has. When the first threshold time has been reached, the process proceeds to step 905 where the application window tile is displayed in accordance with a first visual state. The first visual state may be user configured.

Moving to step 907, a determination is made as to whether an input has been received to access the application window corresponding to the application window tile. Such a situation may occur when a user clicks on the application window to make it the active window or the user clicks on the application widow tile corresponding to the application window to make the application window active. Proceeding to step 909, when an input is received to access the application window and/or application window tile, the application window may be brought to the top of the Z-order and displayed in accordance with the default visual state. The specific implementation may dismiss the first visual state immediately or remove it in an animation similar to how it was introduced. If an input has not been received at step 907, the process proceeds to step 911 where another determination is made as to whether time has reached a second threshold time. If not, the process returns to step 907. If the second threshold time has been reached, at step 913, the application window tile is displayed in accordance with a second visual state. The second visual state also may be user configured. It should be understood that additional threshold times and visual states may be included in accordance with this illustrative example. Further, it should be understood that additional application window representation may be used in accordance with the present invention. For example, an icon or thumbnail corresponding to an application window may change visual states at time intervals in accordance with one or more aspects of the present invention.

With respect to an application programming interface (API), various aspects of the present invention may be performed by an API. For example, public APIs may interface with an operating system to allow the operating system to provide the various features of the present invention. In one embodiment, a software architecture stored on one or more computer-readable media for processing data representative of a change to a visual state of an application window representation may include a component configured to change a visual state of an application window representation and an application program interface to access the component. An API may receive a request to change the visual state of an application window representation, access the necessary function(s) to perform the operation, and then send the results back to an operating system. The operating system may use the data provided from the API to perform the various features of the present invention.

While illustrative systems and methods as described herein embodying various aspects of the present invention are shown, it will be understood by those skilled in the art, that the invention is not limited to these embodiments. Modifications may be made by those skilled in the art, particularly in light of the foregoing teachings. For example, each of the elements of the aforementioned embodiments may be utilized alone or in combination or subcombination with elements of the other embodiments. It will also be appreciated and understood that modifications may be made without departing from the true spirit and scope of the present invention. The description is thus to be regarded as illustrative instead of restrictive on the present invention.

I claim:

1. One or more computer-storage media with computer-executable instructions embodied thereon that when executed by a computing device perform a method for changing a visual state of an application window, wherein the application window includes a frame and a content portion for displaying application content, the method comprising steps of:

displaying first and second application windows, the first application window being active and configured with a default active visual state indicated by a default appearance of the frame on the first application window, and the second application window being inactive and configured with a first inactive visual state indicated by a first-inactive appearance of the frame on the second application window, wherein the first-inactive appearance is different than the default appearance; and automatically changing the first inactive visual state of the second application window to a second inactive visual state that is different than the first inactive visual state, wherein the second inactive visual state is indicated by a second-inactive appearance of the frame on the second application window, wherein the second-inactive appearance is different than the default appearance and the first-inactive appearance, wherein the first-inactive appearance is indicated by an animation including a first number of animated bubbles displayed on and proximate to the second application window and the second-inactive appearance is indicated by an animation including a second number of animated bubbles displayed proximate to the second application window, and wherein the second number is larger than the first number, and wherein the second-inactive appearance is configured to express a higher need for attention than the first-inactive appearance.

2. The media of claim 1, wherein the first inactive visual state is defined by a user configuration.

3. The media of claim 1, wherein the method further comprises:

changing the second inactive visual state of the second application window to a third inactive visual state indicated by a third-inactive appearance of the frame on the second application window, wherein the third inactive appearance is different from the first-inactive appearance, the second-inactive appearance, and the default appearance.

4. The media of claim 3, wherein the third inactive visual state is configured to express a higher need for attention than the second inactive visual state.

5. The media of claim 3, wherein the step of changing the second inactive visual state of the second application window to a third inactive visual state occurs when a time threshold has been reached.

6. The media of claim 3, wherein the method further comprises:

upon changing the visual state of the second application window to the third inactive visual state, changing a corresponding visual state of an application window representation associated with the second application window to a third corresponding inactive visual state.

7. The media of claim 1, wherein the second inactive visual state includes one of a different color, a different pattern, and a different texture from the first inactive visual state.

8. The media of claim 1, further comprising a step of determining whether a first time threshold has been reached, wherein the step of changing the first inactive visual state of the second application window to a second inactive visual state includes changing the first inactive visual state based upon the determination that the first time threshold has been reached.

9. The media of claim 8, further comprising steps of:
determining whether a second time threshold has been reached; and
changing the second inactive visual state of the second application window to a third inactive visual state indicated by a third-inactive appearance of the frame on the second application window based upon the determination that the second time threshold has been reached, wherein the third-inactive appearance is different from the first-inactive appearance, the second-inactive appearance, and the default appearance.

10. The media of claim 1, further comprising steps of:
determining whether an input has been received to access the second application window; and
incident to said determining, changing the second inactive visual state of the application window to the first inactive visual state.

11. The media of claim 1, further comprising a step of receiving a command to change the first inactive visual state of the second application window.

12. The media of claim 11, wherein the command correlates to a notification of an event.

13. The media of claim 12, wherein the event is a scheduled event.

14. The media of claim 1, wherein the method further comprises:
upon changing the visual state of the second application window from the first inactive visual state to the second inactive visual state, changing a corresponding visual state of an application window representation associated with the second application window from a first corresponding inactive visual state to a second corresponding visual state.

15. The one or more media of claim 1, wherein the second application window is associated with a scheduling program and displays an appointment reminder.

16. A method for changing a visual state of an application window in a desktop space, wherein the application window includes a frame and a content portion for displaying application content, the method comprising steps of:
displaying first and second application windows in a desktop space, the first application window being active and configured with a default active visual state, and the second application window being inactive and configured with a default inactive visual state;
receiving a first command to change the default inactive visual state of the second application window;
changing the default inactive visual state of the second application window to a different inactive visual state, wherein the different inactive visual state is configured to express a higher need for attention than the default inactive visual state;
receiving a second command to change the different inactive visual state of the second application window; and
changing the different inactive visual state of the second application window to a second different inactive visual state, the second different inactive visual state being different from the default inactive visual state, wherein the second different inactive visual state is configured to express a higher need for attention than the different inactive visual state, wherein the different inactive visual state is indicated by an animation including a first number of animated bubbles displayed on and proximate to the second application window and the second different inactive visual state is indicated by an animation including a second number of animated bubbles displayed proximate to the second application window, and wherein the second number is larger than the first number.

17. The method of claim 16, wherein the step of changing the different inactive visual state of the second application window occurs when a time threshold has been reached, and wherein the second application window is associated with a scheduling program.

18. The method of claim 16, further comprising steps of:
receiving a third command to access the second application window; and
redisplaying the first and second application windows in the desktop space, the first application window being inactive and configured with the default inactive visual state, and the second application window being active and configured with the default active visual state.

19. A software architecture stored on one or more computer-storage media for processing data representative of a visual state of an application window, wherein the application window includes a frame and a content portion for displaying application content, comprising:
at least one component configured to change a visual state of an application window to one or more of a first inactive visual state, a second inactive visual state, and a third inactive visual state based on one or more events related to an application associated with the application window, wherein the first inactive visual state, the second inactive visual state, and the third inactive visual state are each configured to convey different degrees of urgency associated with the one or more events, wherein the first inactive visual state is indicated by an animation including a first number of animated bubbles displayed on and proximate to the second application window and the second inactive visual state is indicated by an animation including a second number of animated bubbles displayed proximate to the second application window, and wherein the second number is larger than the first number; and
at least one application program interface to access the at least one component;
upon changing the visual state of the second application window to the third inactive visual state, changing a corresponding visual state of an application window representation associated with the second application window to a third corresponding inactive visual state.

* * * * *